(12) United States Patent
Ito

(10) Patent No.: US 7,242,533 B2
(45) Date of Patent: Jul. 10, 2007

(54) TWO-UNIT ZOOM LENS SYSTEM, AND EXCHANGEABLE LENS AND ELECTRONIC IMAGE TAKING APPARATUS USING THE ZOOM LENS SYSTEM

(75) Inventor: Kazumi Ito, Mitaka (JP)

(73) Assignee: Olympus Imaging Corp., Tokyo (JP)

( * ) Notice: Subject to any disclaimer, the term of this patent is extended or adjusted under 35 U.S.C. 154(b) by 0 days.

(21) Appl. No.: 11/518,067

(22) Filed: Sep. 8, 2006

(65) Prior Publication Data

US 2007/0064312 A1    Mar. 22, 2007

(30) Foreign Application Priority Data

Sep. 21, 2005   (JP)   ............... 2005-273698

(51) Int. Cl.
*G02B 15/14*   (2006.01)
(52) U.S. Cl. ...................................... 359/691; 359/680
(58) Field of Classification Search ........ 359/676–683, 359/685–691
See application file for complete search history.

(56) References Cited

U.S. PATENT DOCUMENTS

| | | | |
|---|---|---|---|
| 4,993,814 A | 2/1991 | Hata | |
| 5,781,349 A * | 7/1998 | Sugawara | ................... 359/691 |
| 6,229,655 B1 | 5/2001 | Kohno et al. | |
| 6,456,443 B2 | 9/2002 | Kohno et al. | |
| 6,532,114 B1 | 3/2003 | Kohno et al. | |

FOREIGN PATENT DOCUMENTS

| | | |
|---|---|---|
| JP | 2001-021806 | 1/2001 |
| JP | 2001-215407 | 8/2001 |

* cited by examiner

*Primary Examiner*—Ricky Mack
*Assistant Examiner*—M. Hasan
(74) *Attorney, Agent, or Firm*—Kenyon & Kenyon LLP

(57) ABSTRACT

A two-unit zoom lens system which comprises a negative first lens unit G1 and a positive second lens unit G2, during change of magnification from a wide-angle end to a telephoto end, the first lens unit and the second lens unit are moved so as to reduce a space between the first lens unit and the second lens unit, the first lens unit includes a negative sub-unit $G_{1a}$ and a positive sub-unit $G_{1b}$, the second lens unit has a first positive lens $L_{21}$, a second negative lens $L_{22}$, and a third positive lens $L_{23}$, and the system further has an aperture stop S disposed in an air space which comes into contact with the first positive lens $L_{21}$.

16 Claims, 11 Drawing Sheets

TWO-UNIT ZOOM LENS SYSTEM, AND EXCHANGEABLE LENS AND ELECTRONIC IMAGE TAKING APPARATUS USING THE ZOOM LENS SYSTEM

CROSS REFERENCE TO RELATED APPLICATIONS

This application claims benefit under 35 U. S. C. § 119 of Japanese Patent Applications of No. 2005-273,698 filed in Japan on Sep. 21, 2005, the contents of which are incorporated herein by reference.

BACKGROUND OF THE INVENTION

1. Field of the Invention

The present invention relates to a two-unit zoom lens system, an exchangeable lens using this two-unit zoom lens system, and further an electronic image taking apparatus using this two-unit zoom lens system.

2. Description of the Related Art

There is expanded a market of a single lens reflex (SLR) camera using an electronic image pickup device such as a CCD image sensor or a CMOS type image sensor. Heretofore, a conventional small-sized zoom lens system including the standard angle of field with respect to the SLR camera for a silver salt film is constituted of a first lens unit having a negative refractive power and a second lens unit having a positive refractive power.

Moreover, as a two-unit zoom lens system of a negative-positive type having a long back focal length (the optical path length between the rearmost surface of the lens system and the image plane), there are proposed several zoom lens systems usable with a small-sized image pickup device. As the two-unit zoom lens system of the negative-positive type in which the number of lenses constituting the zoom lens system is small, there are known systems disclosed in Japanese Patent Application Laid-Open Nos. 2001-215407, 2000-187157, 2001-21806 and 1-183615.

In the two-unit zoom lens system described in Japanese Patent Application Laid-Open No. 2001-215407, an aperture stop is disposed on the image side of the second lens unit. There is also disclosed a two-unit zoom lens system in which an off-axial chief ray is considerably inclined with respect to the image plane on the exit side of the zoom lens system.

Moreover, in the two-unit zoom lens systems described in Japanese Patent Application Laid-Open Nos. 2000-187157, 2001-21806 and 1-183615, the whole length is long as compared with a size of the image pickup device. When the system is used with a large image pickup device, the whole length increases. A magnification changing ratio is small.

As compared with the SLR camera for the silver salt film, in the SLR camera in which an electronic image pickup device such as a CCD image sensor is used, in general, a diagonal length of an image pickup surface is small. To prevent so-called shading phenomenon, from the center of the image pickup surface to a periphery thereof, a light flux needs to be incident on the image pickup surface in a state nearly vertical state with respect to the image pickup surface. A space for disposing a low pass filter and the like is required. Therefore, it is necessary to increase a ratio of a back focal length fb of a photographing lens with respect to the diagonal length. When this ratio is increased, an additional function can be introduced. On the other hand, if a large back focal length fb is required, such a lens constitution is required that the large back focal length fb can be secured on a wide-angle end of a region of the magnification change.

BRIEF SUMMARY OF THE INVENTION

A zoom lens system of the present invention is a two-unit zoom lens system comprising: a first lens unit having a negative refractive power; and a second lens unit having a positive refractive power in order from an object side to an image side, wherein during change of magnification from a wide-angle end to a telephoto end, the first lens unit and the second lens unit are moved so as to reduce a space between the first lens unit and the second lens unit.

In addition, in one aspect, in the zoom lens system of the present invention, the first lens unit comprises, in order from the object side, a negative sub-unit $G_{1a}$ and a positive sub-unit $G_{1b}$, the second lens unit comprises, in order from the object side, a first lens $L_{21}$ having a positive refractive power, a second lens $L_{22}$ having a negative refractive power, and a third lens $L_{23}$ having a positive refractive power, the two-unit zoom lens system further comprising:

an aperture stop disposed in an air space which comes into contact with the first lens $L_{21}$, the following conditions (A), (B) being satisfied:

$$-1.5 < (r_{21a} + r_{21b})/(r_{21a} - r_{21b}) < -0.87 \qquad (A);$$

and $$-1.0 < (r_{22a} + r_{22b})/(r_{22a} - r_{22b}) < -0.28 \qquad (B),$$

in which $r_{21a}$ denotes a paraxial radius of curvature of an object-side surface of the first lens $L_{21}$, $r_{21b}$ denotes a paraxial radius of curvature of an image-side surface of the first lens $L_{21}$, $r_{22a}$ denotes a paraxial radius of curvature of an object-side surface of the second lens $L_{22}$, and r22b denotes a paraxial radius of curvature of an image-side surface of the second lens $L_{22}$.

Moreover, in another aspect, in the zoom lens system of the present invention, the first lens unit comprises, in order from the object side, a negative sub-unit $G_{1a}$ and a positive sub-unit $G_{1b}$, the second lens unit comprises, in order from the object side, a first lens $L_{21}$ having a positive refractive power, a second lens $L_{22}$ having a negative refractive power, and a third lens $L_{23}$, the two-unit zoom lens system further comprising:

an aperture stop disposed in an air space which comes into contact with the first lens $L_{21}$ having the positive refractive power, the following conditions (B), (C) being satisfied:

$$-1.0 < (r_{22a} + r_{22b})/(r_{22a} - r_{22b}) < -0.28 \qquad (B);$$

and $$0.5 < f_{2G}/f_{21} < 1.1 \qquad (C),$$

in which $r_{22a}$ denotes a paraxial radius of curvature of an object-side surface of the second lens $L_{22}$, $r_{22b}$ denotes a paraxial radius of curvature of an image-side surface of the second lens $L_{22}$, $f_{2G}$ denotes a focal length of the second lens unit, and $f_{21}$ denotes a focal length of the first lens $L_{21}$.

In addition, in still another aspect, in the zoom lens system of the present invention, the first lens unit comprises, in order from the object side, a negative sub-unit $G_{1a}$ and a positive sub-unit $G_{1b}$, the second lens unit comprises, in order from the object side, a first lens $L_{21}$ having a positive refractive power, a second lens $L_{22}$ having a negative refractive power, and a third lens $L_{23}$, the two-unit zoom lens system further comprising:

an aperture stop disposed in an air space which comes into contact with the first lens $L_{21}$ having the positive refractive power, the following conditions (C), (D) being satisfied:

$$0.5 < f_{2G}/f_{21} < 1.1 \quad (C);$$

and $$0.14 < d_{s12}/f_{2G} < 0.20 \quad (D),$$

in which $f_{2G}$ denotes a focal length of the second lens unit, $f_{21}$ denotes a focal length of the first lens $L_{21}$, and $d_{s12}$ denotes an air space along an optical axis between the first lens $L_{21}$ and the second lens $L_{22}$.

Moreover, in a further aspect, in the zoom lens system of the present invention, the first lens unit comprises, in order from the object side, a negative sub-unit $G_{1a}$ and a positive sub-unit $G_{1b}$, the second lens unit comprises, in order from the object side, a first lens $L_{21}$ having a positive refractive power, a second lens $L_{22}$ having a negative refractive power, a third lens $L_{23}$ having a positive refractive power, and a fourth lens $L_{24}$ having an aspherical surface, the two-unit zoom lens system further comprising:

an aperture stop disposed in an air space which comes into contact with the first lens $L_{21}$.

When the above-described zoom lens system is incorporated into a lens barrel having a mount portion detachably attached to a camera body, the zoom lens system can be used as an exchangeable lens for a single lens reflex camera.

Moreover, the above zoom lens system can be used as a photographing lens of an electronic image taking apparatus in which there is used an electronic image pickup device to convert an optical image into an electric signal, such as a CCD image sensor or a CMOS type image sensor.

BRIEF DESCRIPTION OF THE DRAWINGS

FIG. 1A shows a state in a wide-angle end, FIG. 1B shows an intermediate state, and FIG. 1C shows a state in a telephoto end;

FIG. 2A shows a state in a wide-angle end, FIG. 2B shows an intermediate state, and FIG. 2C shows a state in a telephoto end;

FIG. 3A shows a state in a wide-angle end, FIG. 3B shows an intermediate state, and FIG. 3C shows a state in a telephoto end;

FIG. 4A shows a state in a wide-angle end, FIG. 4B shows an intermediate state, and FIG. 4C shows a state in a telephoto end;

FIG. 5A shows a state in a wide-angle end, FIG. 5B shows an intermediate state, and FIG. 5C shows a state in a telephoto end;

FIG. 6A shows a state in a wide-angle end, FIG. 6B shows an intermediate state, and FIG. 6C shows a state in a telephoto end;

FIG. 7A shows a state in a wide-angle end, FIG. 7B shows an intermediate state, and FIG. 7C shows a state in a telephoto end;

FIG. 8A shows a state in a wide-angle end, FIG. 8B shows an intermediate state, and FIG. 8C shows a state in a telephoto end;

FIG. 9A shows a state in a wide-angle end, FIG. 9B shows an intermediate state, and FIG. 9C shows a state in a telephoto end;

FIG. 10A shows a state in a wide-angle end, FIG. 10B shows an intermediate state, and FIG. 10C shows a state in a telephoto end.

DETAILED DESCRIPTION OF THE EMBODIMENTS

Figure 1A:
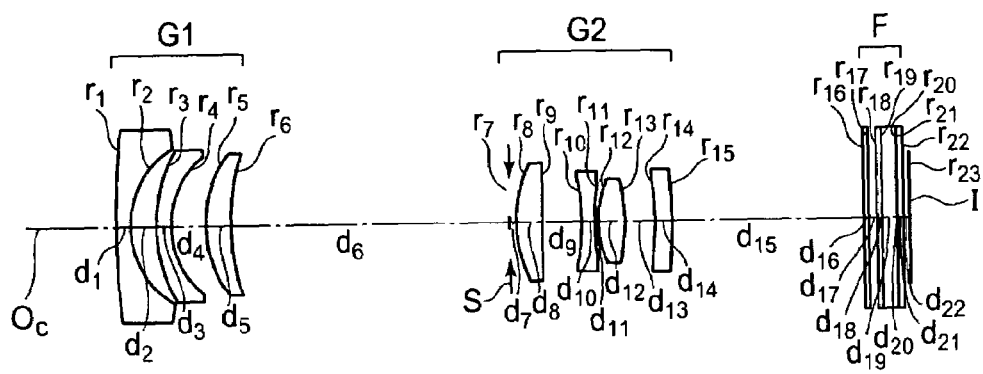
FIGS. 1A to 1C are sectional views each including an optical axis when focused on an infinite object in Example 1 of the present invention.

As described above, a zoom lens system of the present invention is a two-unit zoom lens system having a basic constitution comprising: a first lens unit having a negative refractive power; and a second lens unit having a positive refractive power in order from an object side to an image side, wherein during change of magnification from a wide-angle end to a telephoto end, the first lens unit and the second lens unit are moved so as to reduce a space between the first lens unit and the second lens unit.

Moreover, in one aspect, the first lens unit comprises, in order from the object side, a negative sub-unit $G_{1a}$ and a positive sub-unit $G_{1b}$, and the second lens unit comprises, in order from the object side, a first lens $L_{21}$ having a positive refractive power, a second lens $L_{22}$ having a negative refractive power, and a third lens $L_{23}$ having a positive refractive power.

Moreover, the system has an aperture stop disposed in an air space which comes into contact with the first lens $L_{21}$.

In such a type of two-unit zoom lens system in which the negative and positive lens units are arranged in order from the object side, less lens units move during the change of magnification. This lens type is advantageous in making the zoom lens system small and in securing the angle of field in the wide-angle end.

Since the first lens unit is constituted as described above, it is easy to impart a function of shifting a principal point of the first lens unit toward the object side to shorten the length of the zoom lens system and a function of suppressing miscellaneous aberrations such as chromatic aberration in the first lens unit.

Moreover, since the second lens unit is constituted as described above, it is easy to reduce the aberrations. In the second lens unit, the space between the principal points of the second lens unit enlarges, and this is advantageous in securing the back focal length and the magnification changing ratio.

Furthermore, when the aperture stop is disposed as described above, the angle of field is advantageously secured while keeping the diameter of the first lens unit to be small. Moreover, an off-axial chief ray emitted from the zoom lens system can advantageously be brought nearly parallel to the optical axis.

In addition, it is preferable to satisfy the following conditions (A), (B):

$$-1.5<(r_{21a}+r_{21b})/(r_{21a}-r_{21b})<-0.87 \quad (A);$$

and $$-1.0<(r_{22a}+r_{22b})/(r_{22a}-r_{22b})<-0.28 \quad (B),$$

wherein $r_{21a}$ denotes a paraxial radius of curvature of an object-side surface of the first lens $L_{21}$, $r_{21b}$ denotes a paraxial radius of curvature of an image-side surface of the first lens $L_{21}$, $r_{22a}$ denotes a paraxial radius of curvature of an object-side surface of the second lens $L_{22}$, and $r_{22b}$ denotes a paraxial radius of curvature of an image-side surface of the second lens $L_{22}$.

The condition (A) contributes to ease of securing the magnification changing ratio and of making the zoom lens system small. When the condition (A) is satisfied, the principal point of the first lens $L_{21}$ is shifted toward the object side. Moreover, a curvature of a convex surface of the first lens $L_{21}$ on the object side can be prevented from being enlarged excessively.

Below the lower limit of −1.5 in the condition (A), the curvature of the convex surface on the object side becomes excessively large, and it becomes difficult to correct spherical aberration.

Above the upper limit of −0.87 in the condition (A), the function of shifting the principal point toward the object side deteriorates.

The condition (B) is a condition for preventing the curvatures of concave surfaces on opposite sides of the second lens from being enlarged excessively while regulating a shape of the second lens $L_{22}$ and keeping a balance between axial aberration correction and off-axial aberration correction.

Below the lower limit of −1.0 in the condition (B), the curvature of the concave surface on the object side becomes large. On the other hand, above the upper limit of −0.28 in the condition (B), the curvature of the concave surface on the image side becomes large, and it becomes difficult to keep the balance between the axial aberration and the off-axial aberration.

Next, in another aspect, in the zoom lens system of the present invention, instead of the above combination of the conditions (A) and (B), it is preferable to satisfy the following conditions (B), (C):

$$-1.0<(r_{22a}+r_{22b})/(r_{22a}-r_{22b})<-0.28 \quad (B);$$

and $$0.5<f_{2G}/f_{21}<1.1 \quad (C),$$

wherein $r_{22a}$ denotes a paraxial radius of curvature of an object-side surface of the second lens $L_{22}$, $r_{22b}$ denotes a paraxial radius of curvature of an image-side surface of the second lens $L_{22}$, $f_{2G}$ denotes a focal length of the second lens unit, and $f_{21}$ denotes a focal length of the first lens $L_{21}$.

The condition (B) has been described above.

The condition (C) is a condition which defines a power to be distributed to the first lens $L_{21}$ so that the principal point of the second lens unit is in an appropriate position in order to secure the magnification changing ratio of the zoom lens system.

Below the lower limit of 0.5 in the condition (C), the focal length of the first lens $L_{21}$ increases, and the function of adjusting the principal point deteriorates. A burden of the refractive power of the positive lens on the image side in the second lens unit enlarges, and this easily becomes disadvantageous in the aberration correction.

Above the upper limit of 1.1 in the condition (C), the focal length of the first lens $L_{21}$ shortens, the principal point becomes excessively close to the object side, and it becomes difficult to correct spherical aberration.

When the conditions (A) to (C) are simultaneously satisfied, the balance is more advantageously kept between the function of appropriately adjusting the principal point of the second lens unit and the aberration correction.

In still another aspect, in the zoom lens system of the present invention, instead of the above combination of the conditions (B) and (C), it is preferable to satisfy the following conditions (C), (D):

$$0.5<f_{2G}/f_{21}<1.1 \quad (C);$$

and $$0.14<d_{s12}/f_{2G}<0.20 \quad (D),$$

wherein $f_{2G}$ denotes a focal length of the second lens unit, $f_{21}$ denotes a focal length of the first lens $L_{21}$, and $d_{s12}$ denotes an air space along an optical axis between the first lens $L_{21}$ and the second lens $L_{22}$.

The condition (C) has been described above.

On the other hand, when the refractive power of the first lens $L_{21}$ is weakened while satisfying the condition (C), the function of shifting the principal point toward the object side deteriorates. To compensate for this disadvantage, it is effective to appropriately secure the air space between the first lens $L_{21}$ and the second lens $L_{22}$. In the case where the condition (D) is satisfied, even when the refractive power of the first lens $L_{21}$ is weakened, the function of shifting the principal point of the second lens unit toward the object is kept. Moreover, the space between the principal points of the second lens unit is advantageously secured.

Below the lower limit of 0.14 in the condition (D), the air space is reduced, the function of shifting the principal point toward the object side deteriorates, and this is disadvantageous for obtaining a high magnification changing ratio (zooming ratio).

Above the upper limit of 0.20 in the condition (D), the air space between the first lens $L_{21}$ and the second lens $L_{22}$ enlarges, and this is disadvantageous for miniaturizing the second lens unit.

The above zoom lens system may be constituted so that the second lens unit includes a fourth lens $L_{24}$ disposed on the image side of the third lens $L_{23}$ having the positive refractive power.

By the fourth lens, it is possible to correct the axial aberration or the off-axial aberration which cannot be corrected by the positive lens $L_{21}$, the negative lens $L_{22}$ and the positive lens $L_{23}$ of the second lens unit.

It is preferable that the fourth lens $L_{24}$ has an aspherical surface. To keep an aberration balance between the axial aberration and the off-axial aberration, it is preferable to dispose the aspherical surface in a position having an appropriate distance from the aperture stop. The aspherical surface disposed on the fourth lens $L_{24}$ advantageously functions to keep the aberration balance between the axial aberration and the off-axial aberration.

In a still further aspect, in the zoom lens system of the present invention, in addition to the above basic constitution, the first lens unit comprises, in order from the object side, a negative sub-unit $G_{1a}$ and a positive sub-unit $G_{1b}$, and the second lens unit comprises, in order from the object side, a first lens $L_{21}$ having a positive refractive power, a second lens $L_{22}$ having a negative refractive power, a third lens $L_{23}$ having a positive refractive power, and a fourth lens $L_{24}$ having an aspherical surface.

Moreover, the system can be constituted to include an aperture stop disposed in an air space which comes into contact with the first lens $L_{21}$.

When the first lens unit is constituted as described above, there are advantageously imparted a function of shifting the principal point of the first lens unit toward the object side to shorten the length of the zoom lens system and a function of suppressing miscellaneous aberrations such as chromatic aberration in the first lens unit.

When the second lens unit is constituted of four lenses as described above, the system is advantageously miniaturized, and the aberration balance can be secured.

Moreover, the aperture stop disposed in the above-described position is advantageous in securing the angle of field while keeping the diameter of the first lens unit to be small, and in bringing the off-axial chief ray emitted from the zoom lens system nearly parallel state to the optical axis.

The aspects of the present invention have been described above. Furthermore, when the following constitutions and/or conditions are satisfied, it is possible to obtain a more satisfactory zoom lens system.

First, the constitution of the second lens unit will be described.

In the second lens unit, it is preferable to form the first lens $L_{21}$ having the positive refractive power so that an absolute value of the curvature of the object-side surface is larger than that of the curvature of the image-side surface. It is preferable to form the second lens $L_{22}$ having the negative refractive power so that the absolute value of the curvature of the object-side surface is larger than that of the curvature of the image-side surface. It is preferable that the third lens $L_{23}$ having the positive refractive power has a double-convex shape.

Accordingly, the principal point of the first lens $L_{21}$ is shifted toward the object side, and the first lens has such a shape as to easily obtain a high magnification changing ratio. The second lens $L_{22}$ has such a shape as to easily keep the aberration balance. The third lens $L_{23}$ has such a shape as to easily suppress the aberration, even when a considerable part of the positive refractive power of the second lens unit is imposed on the third lens. When the shapes of the first lens $L_{21}$ to the third lens $L_{23}$ are defined as described above, it becomes easy to correct, by the aspherical surface of the fourth lens $L_{24}$, a residual aberration which remains to be uncorrected by the only lenses $L_{21}$, $L_{22}$ and $L_{23}$.

Moreover, when the second lens unit includes the fourth lens $L_{24}$, it is preferable to satisfy the following condition (E):

$$0.08 < d_{s34}/f_{2G} < 0.28 \quad (E),$$

wherein $d_{s34}$ denotes an air space along an optical axis between the third lens $L_{23}$ and the fourth lens $L_{24}$, and $f_{2G}$ denotes the focal length of the second lens unit.

The positive first lens $L_{21}$, the negative second lens $L_{22}$ and the positive third lens $L_{23}$ of the second lens unit are arranged as in the so-called triplet type lens. When the aspherical lens $L_{24}$ is disposed at an appropriate air space from this lens system, a satisfactory aberration balance is preferably kept between the axial aberration and the off-axial aberration.

When the air space is reduced below the lower limit of 0.08 in the condition (E), the function of correcting the off-axial aberration by the aspherical surface deteriorates.

When the air space enlarges above the upper limit of 0.28 in the condition (E), the function of correcting the axial aberration by the aspherical surface deteriorates. A frame for holding the second lens unit easily enlarges.

The lenses of the second lens unit may be constituted as follows.

In the case where the positive first lens $L_{21}$ has a convex surface which faces the object side, and the curvature of the surface is set to be larger than that of the image-side surface (the absolute value of the curvature of the object-side surface is set to be larger than that of the curvature of the image-side surface), the principal point can be shifted toward the object side, and the magnification changing ratio is preferably secured.

It is further preferable to form the first lens L21 as a plano-convex lens or a positive meniscus lens, whose convex surface faces the object side. This is more preferable for securing the magnification changing ratio.

The negative second lens $L_{22}$ is disposed at an air space from the positive first lens $L_{21}$, and has a concave surface which faces the object side. Furthermore, when the negative lens is constituted so as to set the curvature of the surface to be larger than that of the image-side surface (the absolute value of the curvature of the object-side surface is larger than that of the curvature of the image-side surface), the principal point is preferably adjusted, and an appropriate aberration balance can be achieved.

The positive third lens $L_{23}$ having a double-convex shape is preferable for securing the power of the second lens unit and keeping the aberration balance.

When the fourth lens $L_{24}$ has an aspherical surface, from the aberration balance, it is preferable that the aspherical surface is formed into such a shape as to change its power in the negative direction from the center of the surface toward the periphery thereof.

Here, "change the power in the negative direction" means that the positive power decreases or the negative power increases. Therefore, this includes: a case where the whole aspherical surface has the positive power, but the peripheral portion has a weak power as compared with the center; a case where the whole aspherical surface has the negative power, but the peripheral portion has a strong power as compared with the center; a case where the center of the aspherical surface has a positive power, but the peripheral portion has a negative power and the like.

The aspherical surface may be disposed on either the object-side surface or the image-side surface of the fourth lens $L_{24}$, but it is more preferable to dispose the aspherical surface on the image-side surface, in that the thickness of the second lens unit is reduced while disposing the aspherical surface in an appropriate position.

The fourth lens $L_{24}$ may be regarded as a lens having the weakest power (the smallest absolute value of the power) in the second lens unit, the aspherical surface may be disposed on this lens, and the lens may be disposed closest to the image side in the second lens unit. In this case, the position of the lens $L_{24}$ may be adjusted in a direction vertical to the optical axis and/or an optical axis direction in accordance with a manufacturing error such as eccentricity generated in the second lens unit. Accordingly, deterioration of an optical performance is prevented from being caused by the manufacturing error, and more stable production can preferably be performed.

It is to be noted that the second lens unit may be constituted so as to satisfy one or a plurality of conditions among the conditions (A) to (E). There have already been described the examples in which the combination of the conditions (A) and (B), the combination of the conditions (B) and (C), and the combination of the conditions (C) and (D) are satisfied as the individual aspects of the present invention, respectively.

Next, the constitution of the first lens unit will be described.

The negative sub-unit $G_{1a}$ can be constituted of a negative first lens $L_{11}$ and a negative second lens $L_{12}$ in order from the object side. The positive sub-unit $G_{1b}$ may be constituted so as to include a positive lens $L_{13}$.

When miniaturization is aimed, the power of each lens unit needs to be strengthened. When the power of each lens unit is strengthened, however, an amount of aberration to be generated accordingly increases. To avoid this, from a viewpoint of aberration correction, it is preferable to dispose two negative lenses (negative first lens $L_{11}$, negative second lens $L_{12}$) in the first lens unit entirely having the negative power, and divide the power.

Moreover, a constitution in which the positive lens $L_{13}$ is disposed in the sub-unit $G_{1b}$ on the image side in order to minimize a ray height is preferable in that chromatic aberration be corrected, and the principal point of the first lens unit be adjusted to reduce the whole length.

A constitution in which the sub-unit $G_{1b}$ is constituted of only one lens $L_{13}$ is preferable because the first lens unit is simplified and miniaturized.

To reduce generation of distortion, it is preferable that each lens of the first lens unit is a meniscus lens whose convex surface faces the object side.

Moreover, in the negative sub-unit $G_{1a}$, there may be disposed an aspherical lens having aspherical surfaces on an object-side surface of the lens and an image-side surface thereof. This is preferable in respect of the aberration correction and manufacturing cost.

Even if one aspherical surface is disposed, it is possible to correct distortion, but to correct the aberration including astigmatism with good balance, it is preferable to dispose a plurality of aspherical surfaces.

When a plurality of aspherical surfaces is disposed, a plurality of lenses each having the aspherical surface on one surface thereof may be used. However, the increasing of the number of the aspherical lenses results in an increase in cost. When there are considered deterioration of the optical performance due to relative eccentricity between the aspherical surfaces, time and effort of adjustment for preventing the relative eccentricity and the like, it is preferable to dispose the aspherical surfaces on opposite surfaces of one lens.

In the case where a plurality of aspherical surfaces are arranged in the negative sub-unit $G_{1a}$, it is preferable to dispose the aspherical surfaces on the opposite surfaces of the negative second lens $L_{12}$.

From a viewpoint of the correction of the off-axial aberration, it is preferable to use the aspherical surface in a position distant from the aperture stop. Conversely, if the aspherical surface is excessively distant from the aperture stop, however, it becomes difficult to manufacture the aspherical surface because the effective diameter increases. When the lens having the aspherical surfaces on the opposite surfaces is used in the second lens $L_{12}$ from the object side, the manufacturing cost can be reduced while keeping the satisfactory aberration balance.

Furthermore, to minimize the manufacturing cost, it is more preferable to use a resin lens in the lens $L_{12}$.

It is preferable that the negative lens $L_{12}$ is constituted of a lens having the aspherical surfaces on the opposite surfaces thereof, and shaped so that the positive power of the object-side surface strengthens toward the periphery, and the negative power of the image-side surface weakens toward the periphery.

According to such a constitution, the negative power of the peripheral portion of the lens can be prevented from being excessively strengthened. This is more preferable from a viewpoint of the correction of the off-axial aberration in the wide-angle side.

Next, a position of the aperture stop will be described.

The aperture stop can be disposed in the space on the object side of the second lens unit.

In the two-unit zoom lens system in which the refractive power is distributed to be negative and positive from the object side, the outer diameter of the first lens unit easily enlarges.

When the aperture stop is positioned as described above, the exit pupil can be positioned to be distant from the image surface while suppressing enlargement of the outer diameter of the first lens unit.

Moreover, since the frame for holding the lenses of the second lens unit can be integrally constituted, the aberration due to the mutual eccentricity between the lenses is not easily generated.

The aperture stop may be positioned in the space on the image side of the lens $L_{21}$ of the second lens unit.

According to such a constitution, it is possible to reduce the space between the first lens unit and the second lens unit in the telephoto end, and this is advantageous for securing a high magnification changing ratio.

The above-described conditions can be modified as follows.

In the condition (A), the lower limit is set to preferably −1.3, more preferably −1.2 from the viewpoint of aberration correction. It is more preferable to set the upper limit to −0.9 from viewpoints of a small size and a high magnification changing ratio.

In the condition (B), the lower limit is set to preferably −0.8, more preferably −0.6 from the viewpoint of aberration balance. The upper limit is set to preferably −0.3, more preferably −0.33 from the viewpoint of the aberration balance.

In the condition (C), the lower limit is set to preferably 0.7 from the viewpoint of the aberration correction, more preferably 0.85 from the viewpoints of the aberration correction and miniaturization. The upper limit is set to preferably 1.06, more preferably 1.03 from the viewpoint of the aberration correction.

In the condition (D), it is more preferable to set the lower limit to 0.15 from the viewpoint of the high magnification changing ratio. The upper limit is set to preferably 0.19, further preferably 0.185 from the viewpoint of the miniaturization.

In the condition (E), from the viewpoint of the aberration correction, the lower limit is set to preferably 0.1, further preferably 0.12. The upper limit is set to preferably 0.23, further preferably 0.16 from the viewpoint of the aberration correction.

The constitutions and the conditions applied to the two-unit zoom lens system have been described above in detail, and these constitutions and/or conditions can be applied alone or as an arbitrary combination to the zoom lens system. When a plurality of constitutions and/or conditions is simultaneously satisfied, the effect of the miniaturization, the aberration correction or the like can more easily be obtained.

The two-unit zoom lens system can be adapted to an exchangeable lens for a camera.

In general, the exchangeable lens has a lens system, a lens barrel which holds the lens system, and a mount portion for detachably attaching the lens barrel to a camera body. In the negative-positive type of two-unit zoom lens system, a long back focal length can be secured on the rear side of the second lens unit. Therefore, it is preferable to apply the above-described zoom lens system to the exchangeable lens for the single lens reflex camera.

Moreover, the above-described two-unit zoom lens system can be applied to a photographing lens of an electronic image pickup device. In general, an electronic image taking apparatus includes a photographing lens, and an electronic image pickup device which receives an object image formed by the photographing lens to convert an optical image into an electric signal.

The above two-unit zoom lens system is advantageous in securing a telecentric property. In the electronic image pickup device, when a ray is obliquely incident onto the light receiving surface of the electronic image pickup device, light quantity loss and image quality deterioration are easily caused. Therefore, the zoom lens system is preferably used in the electronic image taking apparatus because the telecentric property is easily obtained.

In this case, in the above two-unit zoom lens system, a long back focal length can be secured. Therefore, between the zoom lens system and the electronic image pickup device, it is possible to dispose an optical path splitting member which splits an optical path by reflection. When the optical path splitting member is disposed, a part of a light flux from the zoom lens system is reflected, and an image for observation can be formed in the light path of the reflected light.

As the optical path splitting member which splits the optical path by reflection, there is a member such as a quick return mirror which splits the optical path in time division or a member such as a half mirror which splits the optical path in light quantity division. Either member is usable.

In the case where the image for observation is formed on a reflection side of the optical path splitting member, an object image which does have any parallax from a photographed image can be observed.

Numerical Examples

There will be described hereinafter numerical examples of the zoom lens system of the present invention. First, common matters to Numerical Examples 1 to 5 will be described.

FIGS. 1A to 5C are sectional views each including the optical axis when focused on an infinite object in Numerical Examples 1 to 5. Among them, FIGS. 1A, 2A, 3A, 4A and 5A show states in the wide-angle end, FIGS. 1B, 2B, 3B, 4B and 5B show intermediate states, and FIGS. 1C, 2C, 3C, 4C and 5C show states in the telephoto end. In the drawings, character G1 denotes the first lens unit, S denotes the aperture stop, G2 denotes the second lens unit, F denotes a parallel flat plate group, and I denotes an image surface. It is to be noted that in the parallel flat plate group F, from the object side, VR denotes a vibrating flat plate which throws off dust attached to the surface before photographing by vibration, thereby preventing the image quality from being deteriorated by the dust, IR denotes an IR cut filter which reduces transmission of an infrared ray, LPF denotes a low pass filter, and CG denotes cover glass disposed before the light receiving surface of the electronic image pickup device (CCD image sensor, CMOS type image sensor or the like) disposed in the image plane I. The IR cut filter is integrated with the low pass filter.

The first lens unit G1 having a negative refractive power and the second lens unit G2 having a positive refractive power constitute a retrofocus type in order to secure the back focal length fb. The first lens unit is constituted so as to share the negative power by two lenses of the first lens $L_{11}$ and the second lens $L_{12}$, so that the lens unit has an appropriate power while suppressing the aberration. Furthermore, to correct distortion or astigmatism with good balance, the object side surface of the second lens $L_{12}$ is shaped as an aspherical surface in which the power strengthens from the center toward the periphery of the lens surface. The image side surface of the second lens is shaped as an aspherical surface in which the power weakens from the center toward the periphery of the lens surface.

Moreover, to minimize cost, a molded resin lens is used in the second lens $L_{12}$.

Furthermore, to reduce generation of an aberration, any of the lenses in the first lens unit G1 has a meniscus shape whose convex surface faces the object side.

The second lens unit G2 is constituted of, in order from the object side, the positive first lens $L_{21}$, the negative second lens $L_{22}$, the positive third lens $L_{23}$ and the fourth lens $L_{24}$ having a weak power.

Here, the lens $L_{21}$ is a positive lens having a strong positive refractive power on the object-side surface thereof, and satisfies the above described condition (A).

The lens $L_{22}$ is a negative lens having a strong negative refractive power on the object-side surface thereof, and satisfies the above described condition (B).

The lens $L_{24}$ has an aspherical surface on the image-side surface on which the negative power strengthens toward the periphery. An aspherical lens having a weak power is disposed as the final lens $L_{24}$, and the cetering adjustment of the lens $L_{24}$ is conducted in accordance with a manufacturing error such as eccentricity generated in the second lens unit G2. Accordingly, there is a merit that more stable production can be performed.

Moreover, the lenses of the second lens unit G2 satisfy the above described conditions (C), (D) and (E).

Numerical examples will be described hereinafter, respectively.

Figure 1B:
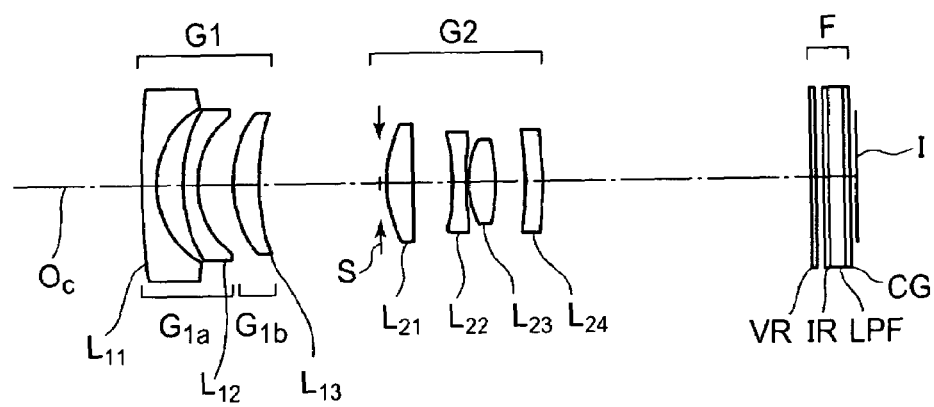
Figure 1C:
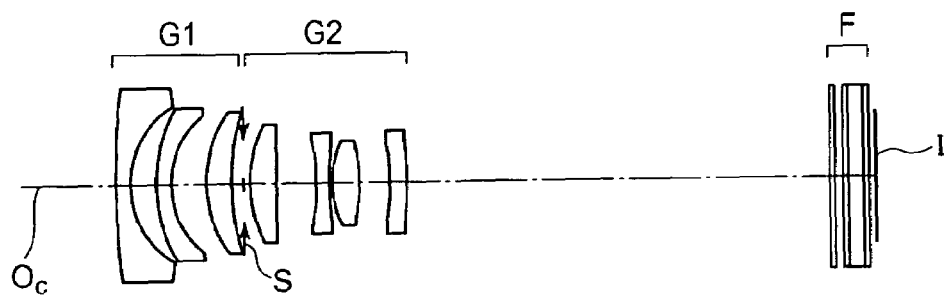

As shown in FIGS. 1A to 1C, the zoom lens system of Numerical Example 1 is constituted of, in order from an object side, a first lens unit G1 having a negative refractive power, an aperture stop S, and a second lens unit G2 having a positive refractive power. During change of magnification from the wide-angle end to the telephoto end, the first lens unit G1 moves along a locus being convex toward the image side, and is positioned closer to the image side in the telephoto end than in the wide-angle end. The second lens unit G2 monotonously moves toward the object side integrally with the aperture stop S.

The first lens unit G1 is constituted of, in order from the object side, two negative meniscus lenses $L_{11}$ and $L_{12}$ whose convex surfaces face the object side, and a positive meniscus lens $L_{13}$ whose convex surface faces the object side. The second lens unit G2 is constituted of, in order from the object side, a plano-convex positive lens $L_{21}$, a double-concave negative lens $L_{22}$, a double-convex positive lens $L_{23}$, and a negative meniscus lens $L_{24}$ whose convex surface faces the image side.

Aspherical surfaces are used on three surfaces including opposite surfaces of the second negative meniscus lens $L_{12}$ of the first lens unit G1, and the image side surface of the last lens $L_{24}$ of the second lens unit G2.

Figure 2A:
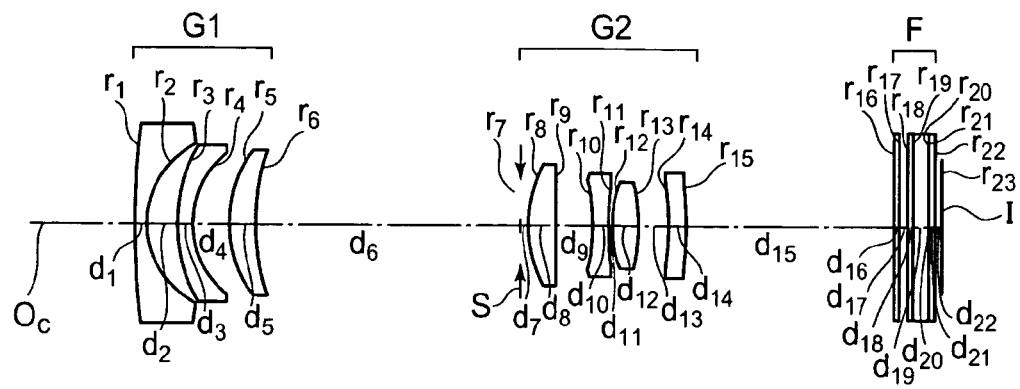
FIGS. 2A to 2C are sectional views each including an optical axis when focused on an infinite object in Example 2 of the present invention.
Figure 2B:
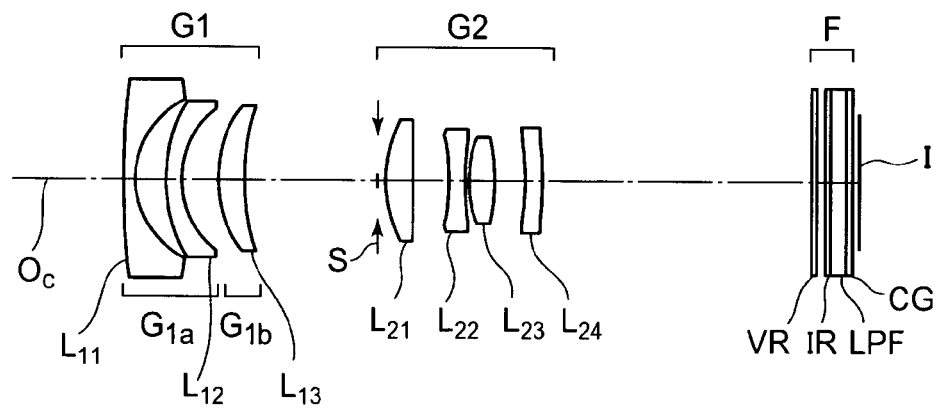
Figure 2C:
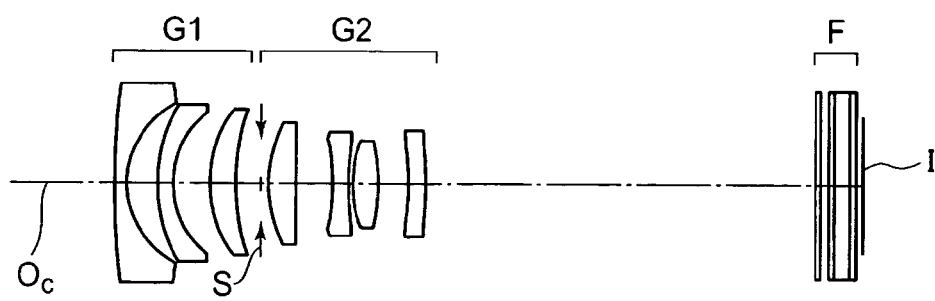

As shown in FIGS. 2A to 2C, the zoom lens system of Numerical Example 2 is constituted of, in order from an object side, a first lens unit G1 having a negative refractive power, an aperture stop S, and a second lens unit G2 having a positive refractive power. During change of magnification from the wide-angle end to the telephoto end, the first lens unit G1 moves along a locus being convex toward the image side, and is positioned closer to the image side in the telephoto end than in the wide-angle end. The second lens unit G2 monotonously moves toward the object side integrally with the aperture stop S.

The first lens unit G1 is constituted of, in order from the object side, two negative meniscus lenses $L_{11}$ and $L_{12}$ whose convex surfaces face the object side, and a positive meniscus lens $L_{13}$ whose convex surface faces the object side. The second lens unit G2 is constituted of, in order from the object side, a double-convex positive lens $L_{21}$, a double-concave negative lens $L_{22}$, a double-convex positive lens $L_{23}$, and a positive meniscus lens $L_{24}$ whose convex surface faces the image side.

Aspherical surfaces are used on three surfaces including opposite surfaces of the second negative meniscus lens $L_{12}$ of the first lens unit G1, and the image side surface of the last lens $L_{24}$ of the second lens unit G2.

Figure 3A:
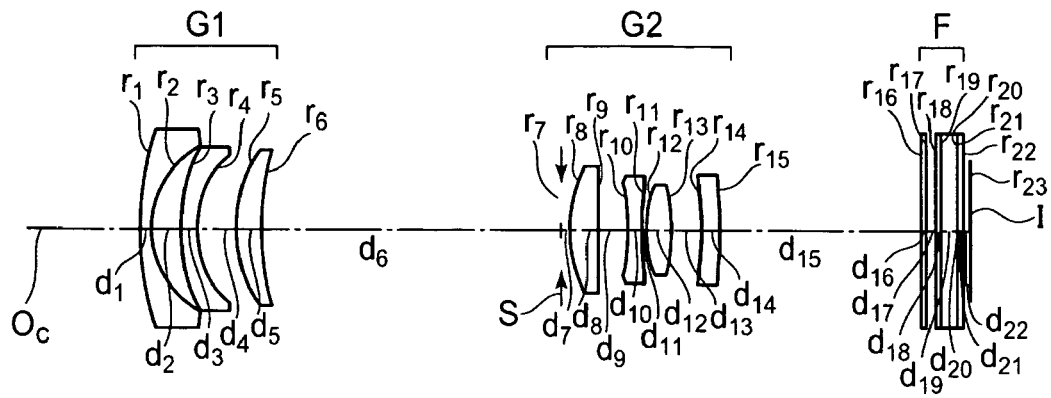
FIGS. 3A to 3C are sectional views each including an optical axis when focused on an infinite object in Example 3 of the present invention.
Figure 3B:
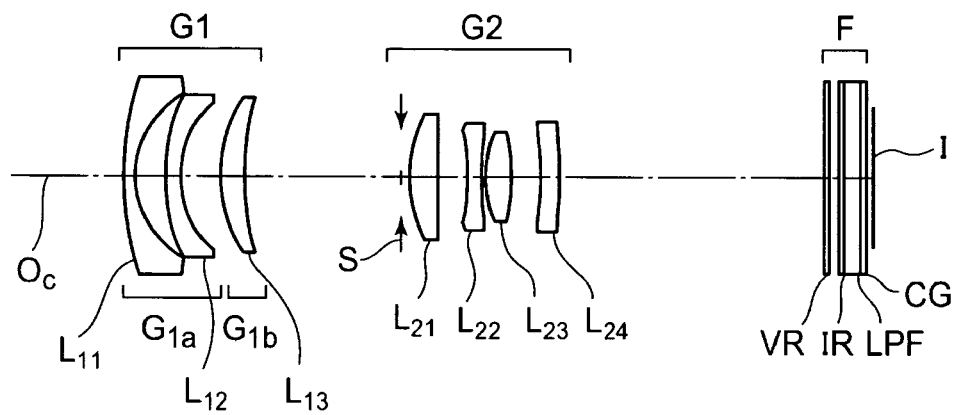
Figure 3C:
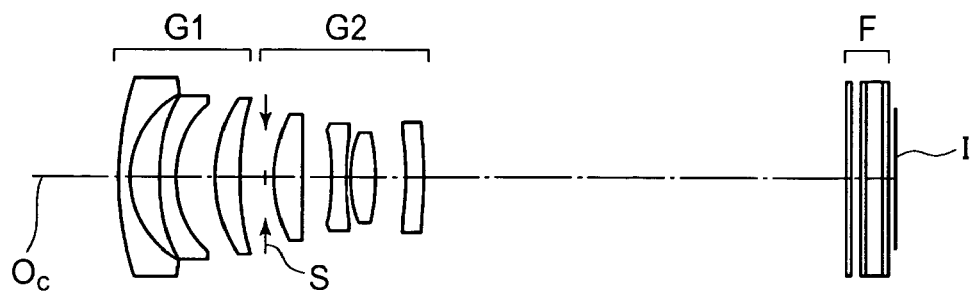

As shown in FIGS. 3A to 3C, the zoom lens system of Numerical Example 3 is constituted of, in order from an object side, a first lens unit G1 having a negative refractive power, an aperture stop S, and a second lens unit G2 having a positive refractive power. During change of magnification from the wide-angle end to the telephoto end, the first lens unit G1 moves along a locus being convex toward the image side, and is positioned closer to the image side in the telephoto end than in the wide-angle end. The second lens unit G2 monotonously moves toward the object side integrally with the aperture stop S.

The first lens unit G1 is constituted of, in order from the object side, two negative meniscus lenses $L_{11}$ and $L_{12}$ whose convex surfaces face the object side, and a positive meniscus lens $L_{13}$ whose convex surface faces the object side. The second lens unit G2 is constituted of, in order from the object side, a positive meniscus lens $L_{21}$ whose convex surface faces the object side, a double-concave negative lens $L_{22}$, a double-convex positive lens $L_{23}$, and a negative meniscus lens $L_{24}$ whose convex surface faces the image side.

Aspherical surfaces are used on three surfaces including opposite surfaces of the second negative meniscus lens $L_{12}$ of the first lens unit G1, and the image side surface of the last lens $L_{24}$ of the second lens unit G2.

Figure 4A:
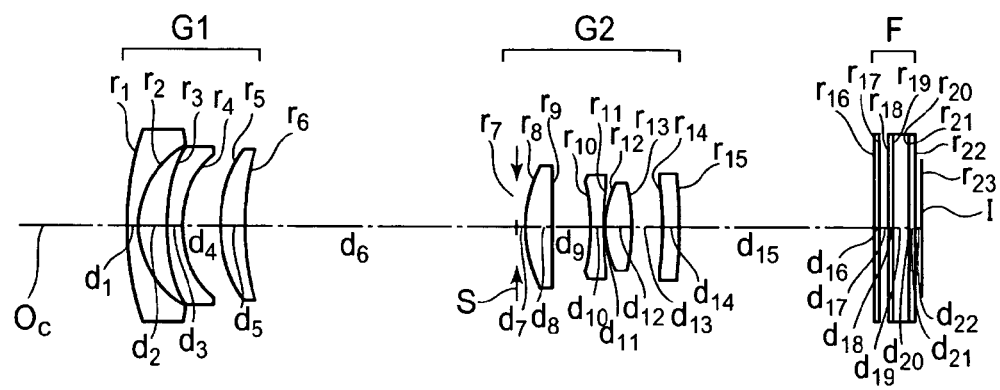
FIGS. 4A to 4C are sectional views each including an optical axis when focused on an infinite object in Example 4 of the present invention.
Figure 4B:
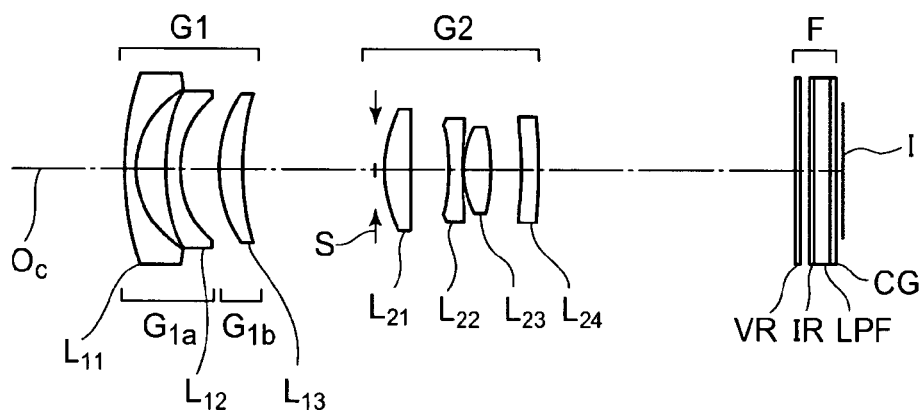
Figure 4C:
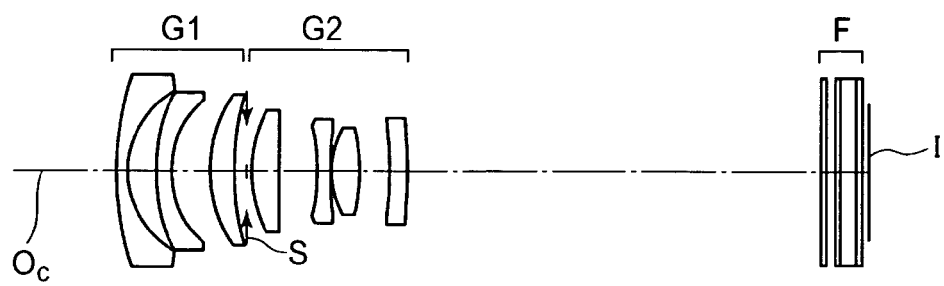

As shown in FIGS. 4A to 4C, the zoom lens system of Numerical Example 4 is constituted of, in order from an object side, a first lens unit G1 having a negative refractive power, an aperture stop S, and a second lens unit G2 having a positive refractive power. During change of magnification from the wide-angle end to the telephoto end, the first lens unit G1 moves along a locus being convex toward the image side, and is positioned closer to the image side in the telephoto end than in the wide-angle end. The second lens unit G2 monotonously moves toward the object side integrally with the aperture stop S.

The first lens unit G1 is constituted of, in order from the object side, two negative meniscus lenses $L_{11}$ and $L_{12}$ whose convex surfaces face the object side, and a positive meniscus lens $L_{13}$ whose convex surface faces the object side. The second lens unit G2 is constituted of a plano-convex positive lens $L_{21}$, a double-concave negative lens $L_{22}$, a double-convex positive lens $L_{23}$, and a positive meniscus lens $L_{24}$ whose convex surface faces the image side.

Aspherical surfaces are used on three surfaces including opposite surfaces of the second negative meniscus lens $L_{12}$ of the first lens unit G1, and the image side surface of the last lens $L_{24}$ of the second lens unit G2.

Figure 5A:
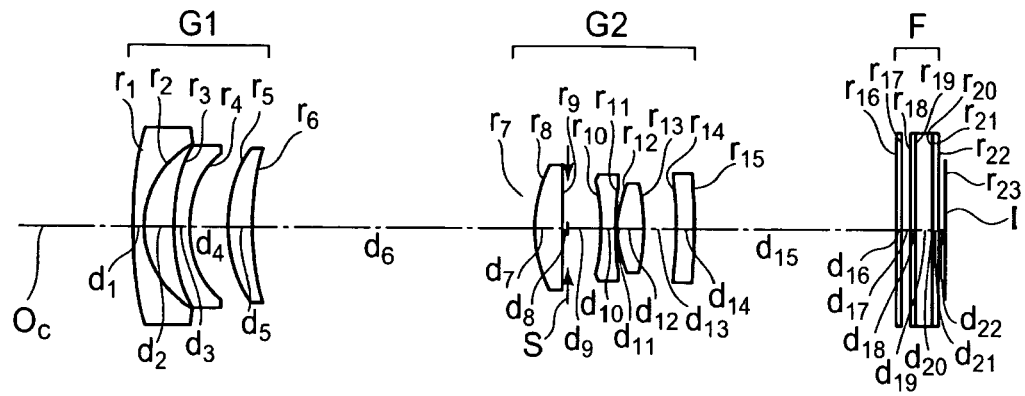
FIGS. 5A to 5C are sectional views each including an optical axis when focused on an infinite object in Example 5 of the present invention.
Figure 5B:
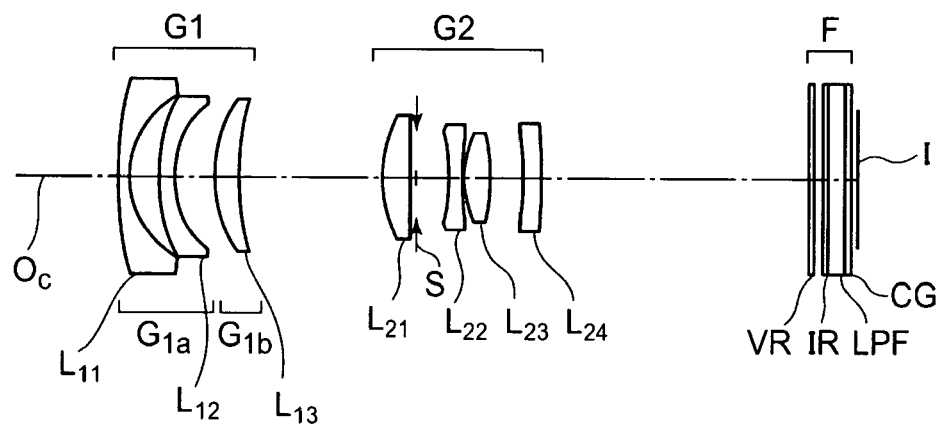
Figure 5C:
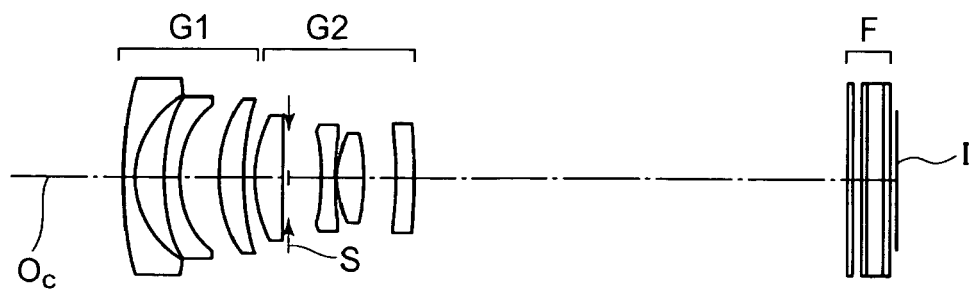
Figure 6A:
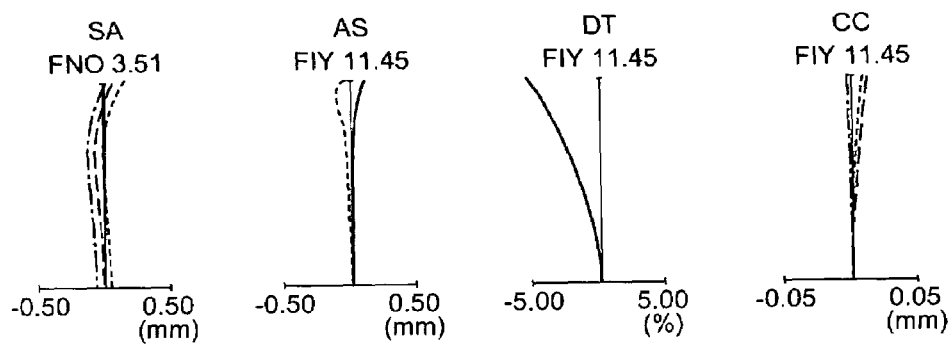
FIGS. 6A to 6C are aberration diagrams showing spherical aberration SA, astigmatism AS, distortion DT and chromatic aberration CC of magnification in Example 1 when focused on the infinite object.
Figure 6B:
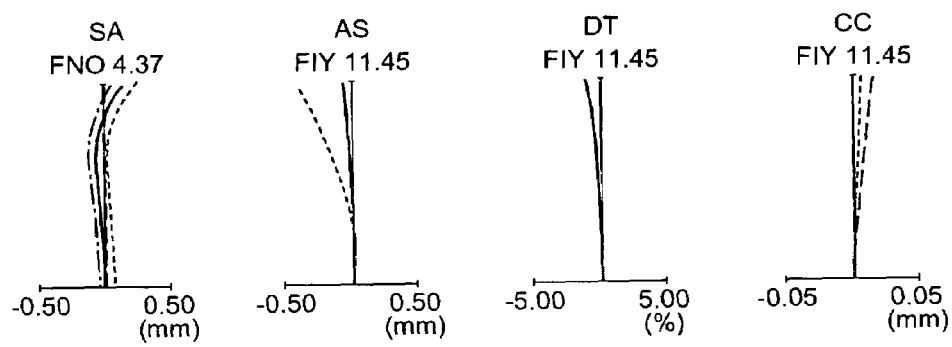
Figure 6C:
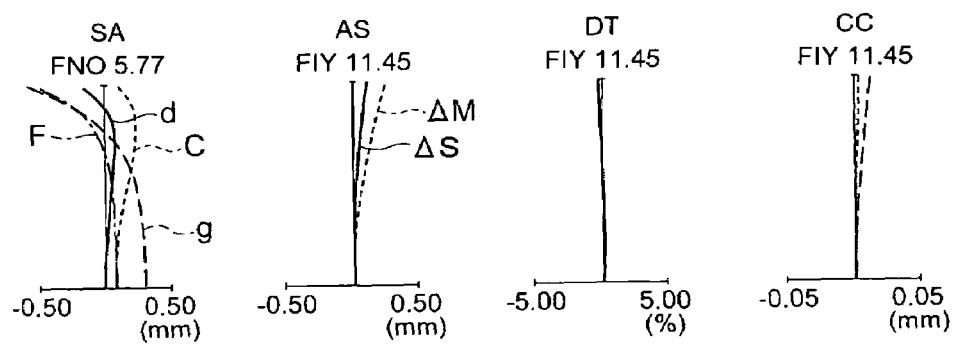
Figure 7A:
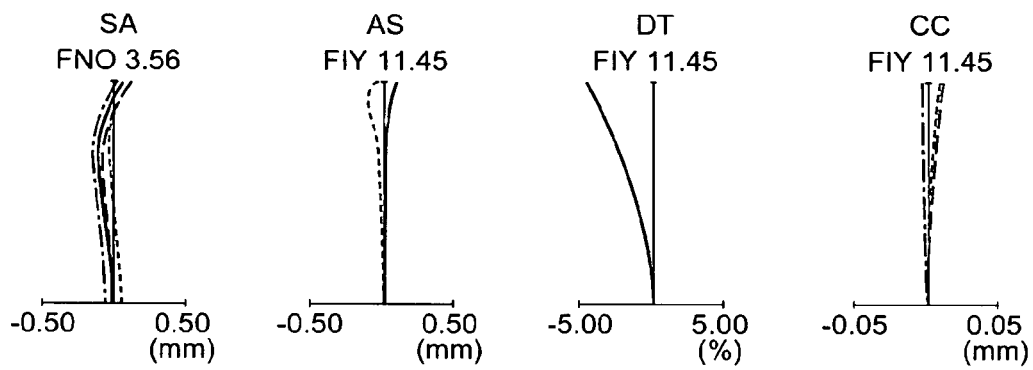
FIGS. 7A to 7C are aberration diagrams showing spherical aberration SA, astigmatism AS, distortion DT and chromatic aberration CC of magnification in Example 2 when focused on the infinite object.
Figure 7B:
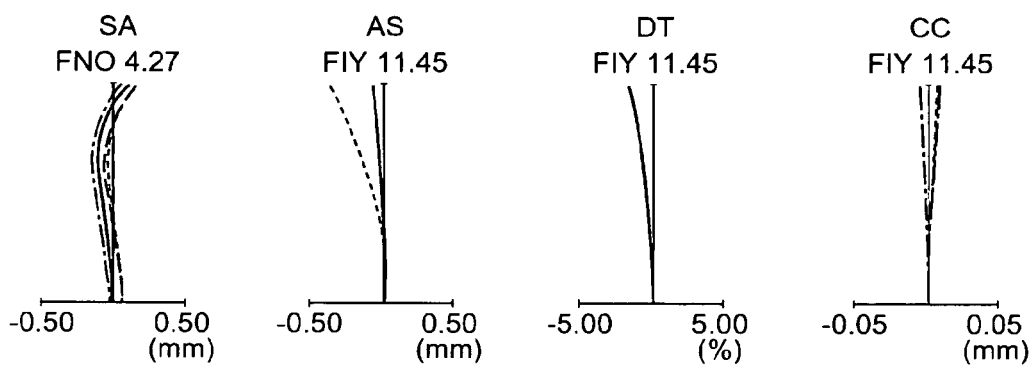
Figure 7C:
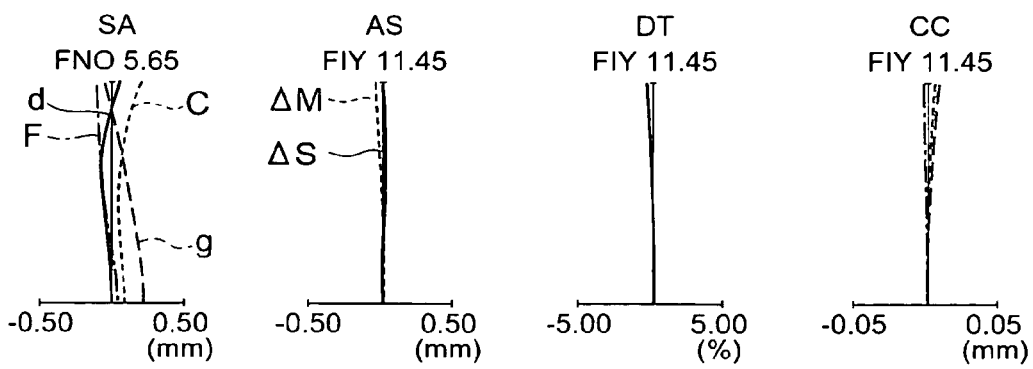
Figure 8A:
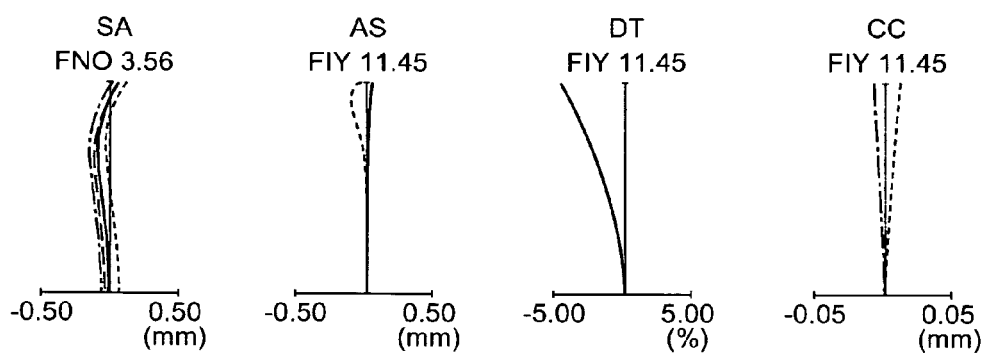
FIGS. 8A to 8C are aberration diagrams showing spherical aberration SA, astigmatism AS, distortion DT and chromatic aberration CC of magnification in Example 3 when focused on the infinite object.
Figure 8B:
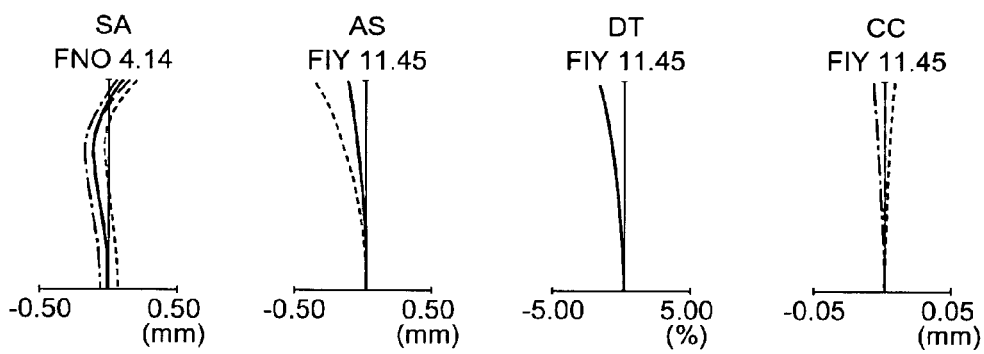
Figure 8C:
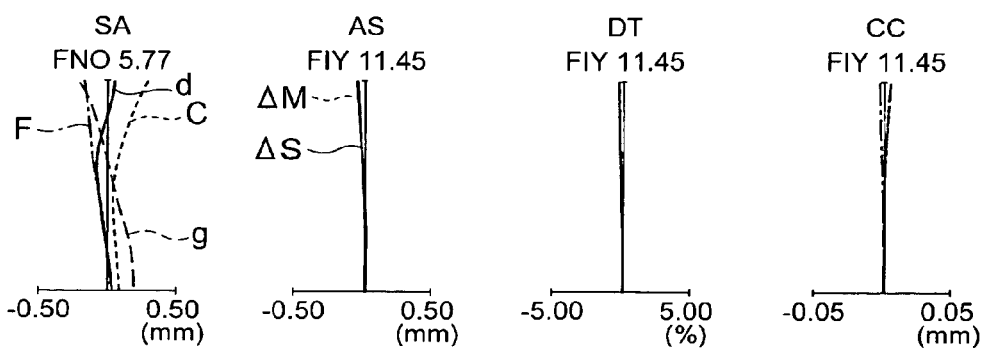
Figure 9A:
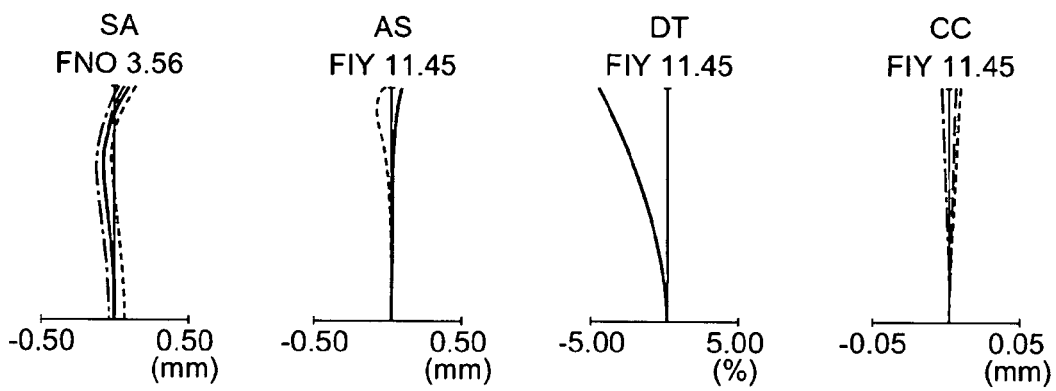
FIGS. 9A to 9C are aberration diagrams showing spherical aberration SA, astigmatism AS, distortion DT and chromatic aberration CC of magnification in Example 4 when focused on the infinite object.
Figure 9B:
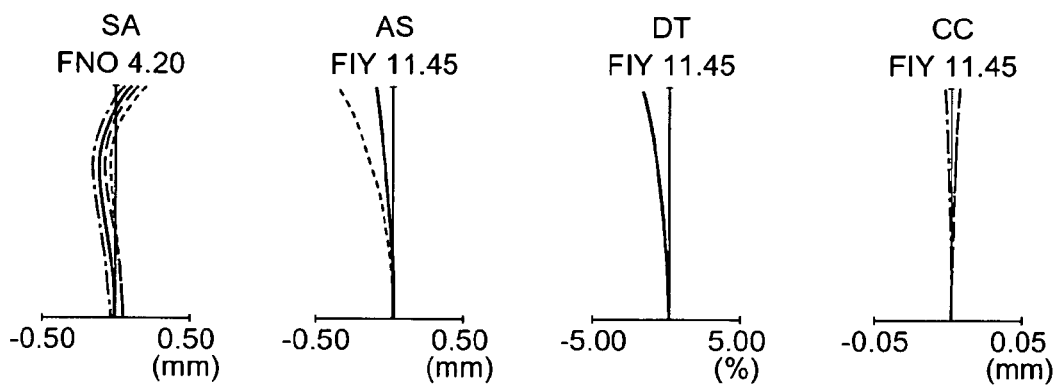
Figure 9C:
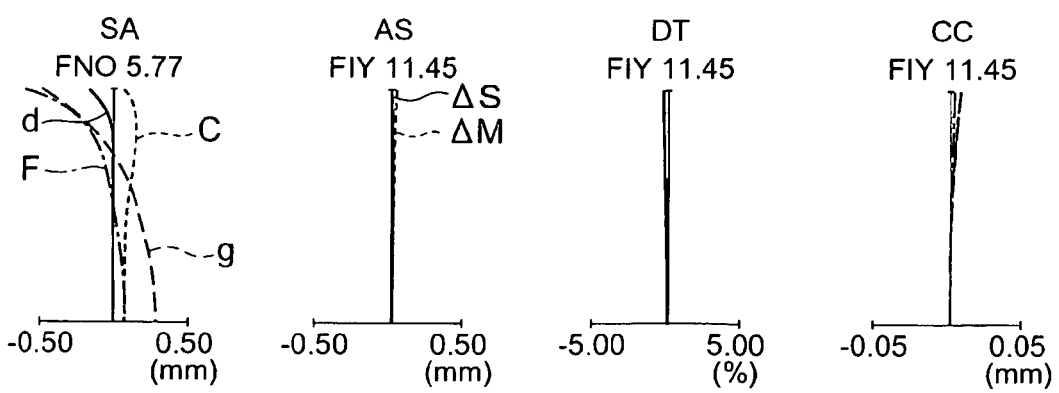
Figure 10A:
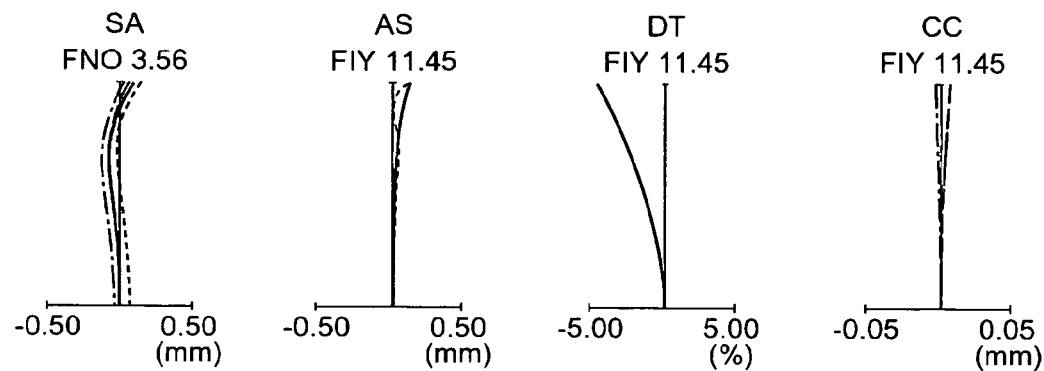
FIGS. 10A to 10C are aberration diagrams showing spherical aberration SA, astigmatism AS, distortion DT and chromatic aberration CC of magnification in Example 5 when focused on the infinite object.
Figure 10B:
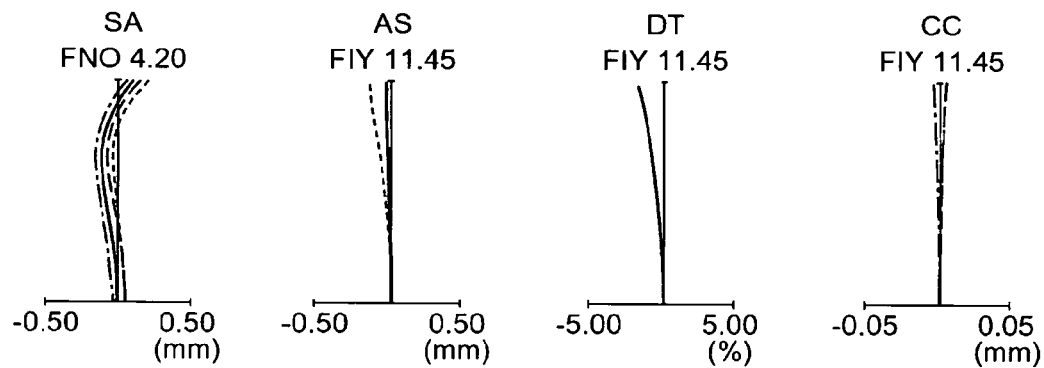
Figure 10C:
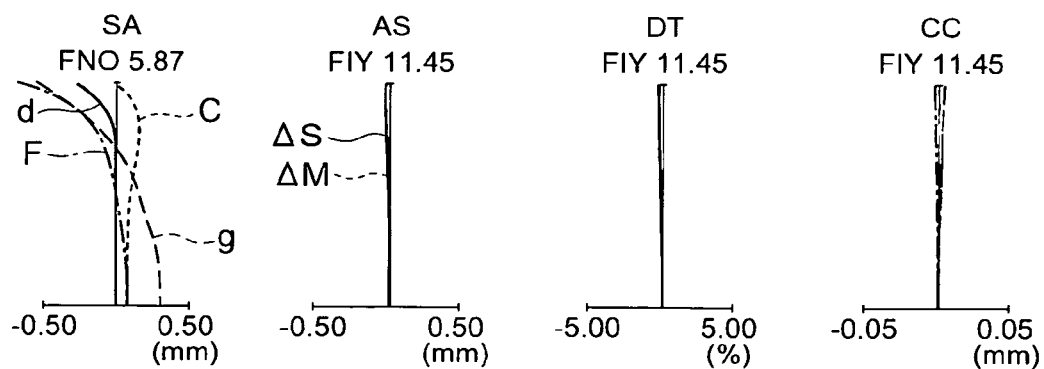

As shown in FIGS. 5A to 5C, the zoom lens system of Numerical Example 5 is constituted of, in order from an object side, a first lens unit G1 having a negative refractive power, an aperture stop S, and a second lens unit G2 having a positive refractive power. During change of magnification from the wide-angle end to the telephoto end, the first lens unit G1 moves along a locus being convex toward the image side, and is positioned closer to the image side in the telephoto end than in the wide-angle end. The second lens unit G2 monotonously moves toward the object side integrally with the aperture stop S.

The first lens unit G1 is constituted of, in order from the object side, two negative meniscus lenses $L_{11}$ and $L_{12}$ whose convex surfaces face the object side, and a positive meniscus lens $L_{13}$ whose convex surface faces the object side. The second lens unit G2 is constituted of a plano-convex positive lens $L_{21}$, a double-concave negative lens $L_{22}$, a double-convex positive lens $L_{23}$, and a positive meniscus lens $L_{24}$ whose convex surface faces the image side.

Aspherical surfaces are used on three surfaces including opposite surfaces of the second negative meniscus lens $L_{12}$ of the first lens unit G1, and the image side surface of the last lens $L_{24}$ of the second lens unit G2. The aperture stop S is disposed between the first lens $L_{21}$ and the second lens $L_{22}$ in the second lens unit G2.

It is to be noted that Numerical Example 5 is a modification of Numerical Example 4, in which the position of the aperture stop is changed, the space between the lens units in the telephoto end is reduced, and the focal length in the telephoto end is increased.

Moreover, even in Numerical Examples 1 to 3, the aperture stop can be disposed in the space on the image side of the lens $L_{21}$. When the aperture stop is disposed in the space on the image side of the lens $L_{21}$, the distance between the first lens unit G1 and the second lens unit G2 in the telephoto end can easily be reduced, and this is advantageous in achieving a high magnification changing ratio.

It is to be noted that focusing on a short distance may be performed by moving the first lens unit G1 toward the object side in any of the numerical examples.

There will be described hereinafter numerical data of the above numerical examples. In addition to the above symbols, f denotes the focal length of the zoom lens system, $F_{NO}$ denotes the F number, 2ω denotes the angle of field, WE denotes the wide-angle end, ST denotes the intermediate state, TE denotes the telephoto end, $r_1, r_2 \ldots$ denote radii of curvature of lens surfaces, $d_1, d_2 \ldots$ denote spaces between the lens surfaces, $n_{d1}, n_{d2} \ldots$ denote refractive indices of the lenses for the d-line, and $V_{d1}, V_{d2} \ldots$ denote Abbe numbers of the lenses. The aspherical shape is defined by the following equation in a coordinate system in which the x-axis agrees with the optical axis, the light travel direction is regarded as positive, and the y-axis is a direction crossing the optical axis at right angles.

After the numeric value of the lens surface, * denotes that the surface is an aspherical surface. After the numeric value of the lens surface, (Stop) indicates that the surface indicates the aperture stop. After the numeric value of the lens surface, (IS) indicates that the surface is an image plane.

$$x = (y^2/r)/[1 + \{1 - (K+1)(y/r)^2\}^{1/2}] + A_4 y^4 + A_6 y^6 + A_8 y^8,$$

wherein r denotes a paraxial radius of curvature, K denotes a conic constant, and $A_4$, $A_6$ and $A_8$ are 4th-order, 6th-order and 8th-order aspherical coefficients.

It is to be noted that in the following numerical data of the numerical examples, the unit of the value indicating a length is mm.

Numerical Example 1

| | | | |
|---|---|---|---|
| $r_1 = 105.666$ | $d_1 = 2.20$ | $n_{d1} = 1.58913$ | $V_{d1} = 61.14$ |
| $r_2 = 15.384$ | $d_2 = 4.09$ | | |
| $r_3 = 36.862^*$ | $d_3 = 2.40$ | $n_{d2} = 1.52542$ | $V_{d2} = 55.78$ |
| $r_4 = 15.840^*$ | $d_4 = 5.67$ | | |
| $r_5 = 22.470$ | $d_5 = 3.74$ | $n_{d3} = 1.67270$ | $V_{d3} = 32.10$ |
| $r_6 = 48.570$ | $d_6 = $ variable | | |
| $r_7 = \infty$ (Stop) | $d_7 = 1.00$ | | |
| $r_8 = 24.102$ | $d_8 = 4.30$ | $n_{d4} = 1.65844$ | $V_{d4} = 50.88$ |
| $r_9 = \infty$ | $d_9 = 5.92$ | | |
| $r_{10} = -33.714$ | $d_{10} = 1.94$ | $n_{d5} = 1.76182$ | $V_{d5} = 26.52$ |
| $r_{11} = 99.929$ | $d_{11} = 0.30$ | | |
| $r_{12} = 20.320$ | $d_{12} = 4.08$ | $n_{d6} = 1.48749$ | $V_{d6} = 70.23$ |
| $r_{13} = -39.677$ | $d_{13} = 4.70$ | | |
| $r_{14} = -58.904$ | $d_{14} = 2.50$ | $n_{d7} = 1.52542$ | $V_{d7} = 55.78$ |
| $r_{15} = -62.010^*$ | $d_{15} = $ variable | | |
| $r_{16} = \infty$ | $d_{16} = 0.62$ | $n_{d8} = 1.51633$ | $V_{d8} = 64.14$ |
| $r_{17} = \infty$ | $d_{17} = 1.21$ | | |
| $r_{18} = \infty$ | $d_{18} = 0.45$ | $n_{d9} = 1.54200$ | $V_{d9} = 77.40$ |
| $r_{19} = \infty$ | $d_{19} = 2.80$ | $n_{d10} = 1.54424$ | $V_{d10} = 70.86$ |
| $r_{20} = \infty$ | $d_{20} = 0.15$ | | |
| $r_{21} = \infty$ | $d_{21} = 0.76$ | $n_{d11} = 1.52310$ | $V_{d11} = 54.49$ |
| $r_{22} = \infty$ | $d_{22} = 1.06$ | | |
| $r_{23} = \infty$ (IS) | | | |

Aspherical coefficients

Third surface $K = 3.295$
$A_4 = 4.32360 \times 10^{-5}$
$A_6 = -1.72480 \times 10^{-7}$
$A_8 = 2.16160 \times 10^{-10}$ Fourth surface $K = -0.287$
$A_4 = 3.15760 \times 10^{-5}$
$A_6 = -2.01110 \times 10^{-7}$
$A_8 = -4.27050 \times 10^{-10}$ Fifteenth surface $K = -0.360$
$A_4 = 6.73690 \times 10^{-5}$
$A_6 = 1.81750 \times 10^{-7}$
$A_8 = 8.33430 \times 10^{-10}$

Zoom data ($\infty$)

| | WE | ST | TE |
|---|---|---|---|
| f (mm) | 16.99 | 27.94 | 50.23 |
| $F_{NO}$ | 3.51 | 4.37 | 5.77 |
| $2\omega$ (°) | 69.34 | 43.97 | 25.07 |
| $d_6$ | 42.00 | 17.72 | 1.00 |
| $d_{15}$ | 28.95 | 40.31 | 63.46 |

Numerical Example 2

| | | | |
|---|---|---|---|
| $r_1 = 76.207$ | $d_1 = 1.80$ | $n_{d1} = 1.58913$ | $V_{d1} = 61.14$ |
| $r_2 = 14.792$ | $d_2 = 4.95$ | | |
| $r_3 = 53.628^*$ | $d_3 = 2.40$ | $n_{d2} = 1.52542$ | $V_{d2} = 55.78$ |
| $r_4 = 18.490^*$ | $d_4 = 5.21$ | | |
| $r_5 = 22.802$ | $d_5 = 3.75$ | $n_{d3} = 1.67270$ | $V_{d3} = 32.10$ |
| $r_6 = 49.181$ | $d_6 = $ variable | | |
| $r_7 = \infty$ (Stop) | $d_7 = 1.00$ | | |
| $r_8 = 22.294$ | $d_8 = 4.03$ | $n_{d4} = 1.65844$ | $V_{d4} = 50.88$ |
| $r_9 = -481.314$ | $d_9 = 5.22$ | | |
| $r_{10} = -34.674$ | $d_{10} = 2.25$ | $n_{d5} = 1.76182$ | $V_{d5} = 26.52$ |
| $r_{11} = 73.003$ | $d_{11} = 0.50$ | | |
| $r_{12} = 23.850$ | $d_{12} = 3.94$ | $n_{d6} = 1.48749$ | $V_{d6} = 70.23$ |
| $r_{13} = -41.250$ | $d_{13} = 4.61$ | | |
| $r_{14} = -66.092$ | $d_{14} = 2.50$ | $n_{d7} = 1.52542$ | $V_{d7} = 55.78$ |
| $r_{15} = -52.926^*$ | $d_{15} = $ variable | | |
| $r_{16} = \infty$ | $d_{16} = 0.62$ | $n_{d8} = 1.51633$ | $V_{d8} = 64.14$ |
| $r_{17} = \infty$ | $d_{17} = 1.21$ | | |
| $r_{18} = \infty$ | $d_{18} = 0.45$ | $n_{d9} = 1.54200$ | $V_{d9} = 77.40$ |
| $r_{19} = \infty$ | $d_{19} = 2.80$ | $n_{d10} = 1.54424$ | $V_{d10} = 70.86$ |
| $r_{20} = \infty$ | $d_{20} = 0.15$ | | |
| $r_{21} = \infty$ | $d_{21} = 0.76$ | $n_{d11} = 1.52310$ | $V_{d11} = 54.49$ |
| $r_{22} = \infty$ | $d_{22} = 1.06$ | | |
| $r_{23} = \infty$ (IS) | | | |

Aspherical coefficients

Third surface $K = 3.060$
$A_4 = 5.62956 \times 10^{-5}$
$A_6 = -1.74033 \times 10^{-7}$
$A_8 = 2.70187 \times 10^{-10}$ Fourth surface $K = -0.433$
$A_4 = 4.68598 \times 10^{-5}$
$A_6 = -1.94817 \times 10^{-7}$
$A_8 = -4.61179 \times 10^{-10}$ Fifteenth surface $K = -0.325$
$A_4 = 5.46162 \times 10^{-5}$
$A_6 = 1.70528 \times 10^{-7}$
$A_8 = 3.21557 \times 10^{-10}$

Zoom data ($\infty$)

| | WE | ST | TE |
|---|---|---|---|
| f (mm) | 17.85 | 26.60 | 44.18 |
| $F_{NO}$ | 3.56 | 4.27 | 5.65 |
| $2\omega$ (°) | 66.36 | 46.13 | 28.44 |
| $d_6$ | 39.26 | 19.74 | 3.90 |
| $d_{15}$ | 29.98 | 39.03 | 57.21 |

Numerical Example 3

| | | | |
|---|---|---|---|
| $r_1 = 52.690$ | $d_1 = 1.96$ | $n_{d1} = 1.72916$ | $V_{d1} = 54.68$ |
| $r_2 = 16.291$ | $d_2 = 4.21$ | | |
| $r_3 = 57.893*$ | $d_3 = 2.40$ | $n_{d2} = 1.52542$ | $V_{d2} = 55.78$ |
| $r_4 = 18.535*$ | $d_4 = 5.17$ | | |
| $r_5 = 23.233$ | $d_5 = 3.70$ | $n_{d3} = 1.68893$ | $V_{d3} = 31.07$ |
| $r_6 = 51.199$ | $d_6 = $ variable | | |
| $r_7 = \infty$ (Stop) | $d_7 = 1.00$ | | |
| $r_8 = 20.927$ | $d_8 = 4.00$ | $n_{d4} = 1.65844$ | $V_{d4} = 50.88$ |
| $r_9 = 290.639$ | $d_9 = 4.74$ | | |
| $r_{10} = -34.470$ | $d_{10} = 2.22$ | $n_{d5} = 1.76182$ | $V_{d5} = 26.52$ |
| $r_{11} = 102.805$ | $d_{11} = 0.50$ | | |
| $r_{12} = 23.295$ | $d_{12} = 3.88$ | $n_{d6} = 1.48749$ | $V_{d6} = 70.23$ |
| $r_{13} = -30.741$ | $d_{13} = 4.24$ | | |
| $r_{14} = -32.563$ | $d_{14} = 2.50$ | $n_{d7} = 1.52542$ | $V_{d7} = 55.78$ |
| $r_{15} = -49.270*$ | $d_{15} = $ variable | | |
| $r_{16} = \infty$ | $d_{16} = 0.62$ | $n_{d8} = 1.51633$ | $V_{d8} = 64.14$ |
| $r_{17} = \infty$ | $d_{17} = 1.21$ | | |
| $r_{18} = \infty$ | $d_{18} = 0.45$ | $n_{d9} = 1.54200$ | $V_{d9} = 77.40$ |
| $r_{19} = \infty$ | $d_{19} = 2.80$ | $n_{d10} = 1.54424$ | $V_{d10} = 70.86$ |
| $r_{20} = \infty$ | $d_{20} = 0.15$ | | |
| $r_{21} = \infty$ | $d_{21} = 0.76$ | $n_{d11} = 1.52310$ | $V_{d11} = 54.49$ |
| $r_{22} = \infty$ | $d_{22} = 1.06$ | | |
| $r_{23} = \infty$ (IS) | | | |

Aspherical coefficients

Third surface $K = 3.060$
$A_4 = 3.22194 \times 10^{-5}$
$A_6 = -7.98024 \times 10^{-8}$
$A_8 = 8.51384 \times 10^{-11}$ Fourth surface $K = -0.434$
$A_4 = 2.55987 \times 10^{-5}$
$A_6 = -9.40307 \times 10^{-8}$
$A_8 = -2.87017 \times 10^{-10}$ Fifteenth surface $K = -0.326$
$A_4 = 6.52226 \times 10^{-5}$
$A_6 = 2.20660 \times 10^{-7}$
$A_8 = 2.99119 \times 10^{-10}$

Zoom data ($\infty$)

| | WE | ST | TE |
|---|---|---|---|
| f (mm) | 17.80 | 26.60 | 49.00 |
| $F_{NO}$ | 3.56 | 4.14 | 5.77 |
| $2\omega$ (°) | 66.45 | 46.12 | 25.70 |
| $d_6$ | 43.65 | 23.00 | 3.90 |
| $d_{15}$ | 29.76 | 38.52 | 60.82 |

Numerical Example 4

| | | | |
|---|---|---|---|
| $r_1 = 87.517$ | $d_1 = 1.80$ | $n_{d1} = 1.58913$ | $V_{d1} = 61.14$ |
| $r_2 = 15.319$ | $d_2 = 4.23$ | | |
| $r_3 = 44.338*$ | $d_3 = 2.40$ | $n_{d2} = 1.52542$ | $V_{d2} = 55.78$ |
| $r_4 = 17.169*$ | $d_4 = 5.72$ | | |
| $r_5 = 22.828$ | $d_5 = 3.61$ | $n_{d3} = 1.67270$ | $V_{d3} = 32.10$ |
| $r_6 = 48.349$ | $d_6 = $ variable | | |
| $r_7 = \infty$ (Stop) | $d_7 = 0.80$ | | |
| $r_8 = 23.224$ | $d_8 = 4.19$ | $n_{d4} = 1.65844$ | $V_{d4} = 50.88$ |
| $r_9 = \infty$ | $d_9 = 5.67$ | | |
| $r_{10} = -36.893$ | $d_{10} = 2.03$ | $n_{d5} = 1.76182$ | $V_{d5} = 26.52$ |
| $r_{11} = 74.746$ | $d_{11} = 0.30$ | | |
| $r_{12} = 21.207$ | $d_{12} = 4.00$ | $n_{d6} = 1.48749$ | $V_{d6} = 70.23$ |
| $r_{13} = -46.231$ | $d_{13} = 4.62$ | | |
| $r_{14} = -84.886$ | $d_{14} = 2.50$ | $n_{d7} = 1.52542$ | $V_{d7} = 55.78$ |
| $r_{15} = -64.507*$ | $d_{15} = $ variable | | |
| $r_{16} = \infty$ | $d_{16} = 0.62$ | $n_{d8} = 1.51633$ | $V_{d8} = 64.14$ |
| $r_{17} = \infty$ | $d_{17} = 1.21$ | | |
| $r_{18} = \infty$ | $d_{18} = 0.45$ | $n_{d9} = 1.54200$ | $V_{d9} = 77.40$ |
| $r_{19} = \infty$ | $d_{19} = 2.80$ | $n_{d10} = 1.54424$ | $V_{d10} = 70.86$ |
| $r_{20} = \infty$ | $d_{20} = 0.15$ | | |
| $r_{21} = \infty$ | $d_{21} = 0.76$ | $n_{d11} = 1.52310$ | $V_{d11} = 54.49$ |
| $r_{22} = \infty$ | $d_{22} = 1.06$ | | |
| $r_{23} = \infty$ (IS) | | | |

Aspherical coefficients

Third surface $K = 3.078$
$A_4 = 4.74671 \times 10^{-5}$
$A_6 = -1.53486 \times 10^{-7}$
$A_8 = 2.05563 \times 10^{-10}$ Fourth surface $K = -0.434$
$A_4 = 3.99175 \times 10^{-5}$
$A_6 = -1.74455 \times 10^{-7}$
$A_8 = -4.22291 \times 10^{-10}$ Fifteenth surface $K = -0.330$
$A_4 = 6.04462 \times 10^{-5}$
$A_6 = 1.92918 \times 10^{-7}$
$A_8 = 4.15648 \times 10^{-10}$

Zoom data ($\infty$)

| | WE | ST | TE |
|---|---|---|---|
| f (mm) | 17.60 | 26.60 | 50.01 |
| $F_{NO}$ | 3.56 | 4.20 | 5.77 |
| $2\omega$ (°) | 67.15 | 46.09 | 25.20 |
| $d_6$ | 40.64 | 20.09 | 1.28 |
| $d_{15}$ | 29.73 | 38.99 | 63.08 |

Numerical Example 5

| | | | |
|---|---|---|---|
| $r_1 = 87.517$ | $d_1 = 1.80$ | $n_{d1} = 1.58913$ | $V_{d1} = 61.14$ |
| $r_2 = 15.319$ | $d_2 = 4.23$ | | |
| $r_3 = 44.338*$ | $d_3 = 2.40$ | $n_{d2} = 1.52542$ | $V_{d2} = 55.78$ |
| $r_4 = 17.169*$ | $d_4 = 5.72$ | | |
| $r_5 = 22.828$ | $d_5 = 3.61$ | $n_{d3} = 1.67270$ | $V_{d3} = 32.10$ |
| $r_6 = 48.349$ | $d_6 = $ variable | | |
| $r_7 = 23.224$ | $d_7 = 4.19$ | $n_{d4} = 1.65844$ | $V_{d4} = 50.88$ |
| $r_8 = \infty$ | $d_8 = 0.80$ | | |
| $r_9 = \infty$ (Stop) | $d_9 = 4.87$ | | |
| $r_{10} = -36.893$ | $d_{10} = 2.03$ | $n_{d5} = 1.76182$ | $V_{d5} = 26.52$ |
| $r_{11} = 74.746$ | $d_{11} = 0.30$ | | |
| $r_{12} = 21.207$ | $d_{12} = 4.00$ | $n_{d6} = 1.48749$ | $V_{d6} = 70.23$ |
| $r_{13} = -46.231$ | $d_{13} = 4.62$ | | |
| $r_{14} = -84.886$ | $d_{14} = 2.50$ | $n_{d7} = 1.52542$ | $V_{d7} = 55.78$ |
| $r_{15} = -64.507*$ | $d_{15} = $ variable | | |
| $r_{16} = \infty$ | $d_{16} = 0.62$ | $n_{d8} = 1.51633$ | $V_{d8} = 64.14$ |
| $r_{17} = \infty$ | $d_{17} = 1.21$ | | |
| $r_{18} = \infty$ | $d_{18} = 0.45$ | $n_{d9} = 1.54200$ | $V_{d9} = 77.40$ |
| $r_{19} = \infty$ | $d_{19} = 2.80$ | $n_{d10} = 1.54424$ | $V_{d10} = 70.86$ |
| $r_{20} = \infty$ | $d_{20} = 0.15$ | | |
| $r_{21} = \infty$ | $d_{21} = 0.76$ | $n_{11} = 1.52310$ | $V_{d11} = 54.49$ |
| $r_{22} = \infty$ | $d_{22} = 1.06$ | | |
| $r_{23} = \infty$ (IS) | | | |

Aspherical coefficients

Third surface $K = 3.078$
$A_4 = 4.74671 \times 10^{-5}$
$A_6 = -1.53486 \times 10^{-7}$
$A_8 = 2.05563 \times 10^{-10}$ -continued Fourth surface K = −0.434
$A_4 = 3.99175 \times 10^{-5}$
$A_6 = -1.74455 \times 10^{-7}$
$A_8 = -4.22291 \times 10^{-10}$ Fifteenth surface K = −0.330
$A_4 = 6.04462 \times 10^{-5}$
$A_6 = 1.92918 \times 10^{-7}$
$A_8 = 4.15648 \times 10^{-10}$ Zoom data (∞)

|  | WE | ST | TE |
|---|---|---|---|
| f (mm) | 17.60 | 26.60 | 51.40 |
| $F_{NO}$ | 3.56 | 4.20 | 5.87 |
| 2ω (°) | 67.15 | 46.08 | 24.53 |
| $d_6$ | 41.44 | 20.89 | 1.50 |
| $d_{15}$ | 29.73 | 38.99 | 64.52 |

FIGS. 6A to 10C show aberration diagrams when the zoom lens systems in Numerical Examples 1 to 5 described above are focused on an infinite object. In these aberration diagrams, FIGS. 6A, 7A, 8A, 9A and 10A show aberrations in the wide-angle end, FIGS. 6B, 7B, 8B, 9B and 10B show aberrations in the intermediate state, and FIGS. 6C, 7C, 8C, 9C and 10C show aberrations in the telephoto end. In the aberration diagrams, SA denotes spherical aberration, AS denotes astigmatism, DT denotes distortion, and CC denotes chromatic aberration of magnification. In the aberration diagrams, "FIY" denotes an image height. Characters C, d, F and g indicate that the aberration curves correspond to wavelengths of C-line, d-line, F-line and g-line, respectively. Characters ΔS and ΔM denote the sagittal image surface and the meridional image surface.

Values of the conditions (A) to (E) of Numerical Examples 1 to 5 described above are described in Table 1 as follows.

TABLE 1

| | Example | | | | |
|---|---|---|---|---|---|
| Condition | 1 | 2 | 3 | 4 | 5 |
| (A) | −1.000 | −0.911 | −1.155 | −1.000 | −1.000 |
| (B) | −0.495 | −0.356 | −0.498 | −0.339 | −0.339 |
| (C) | 0.903 | 1.019 | 0.977 | 0.940 | 0.940 |
| (D) | 0.179 | 0.158 | 0.143 | 0.171 | 0.171 |
| (E) | 0.142 | 0.139 | 0.127 | 0.139 | 0.139 |

Figure 11:
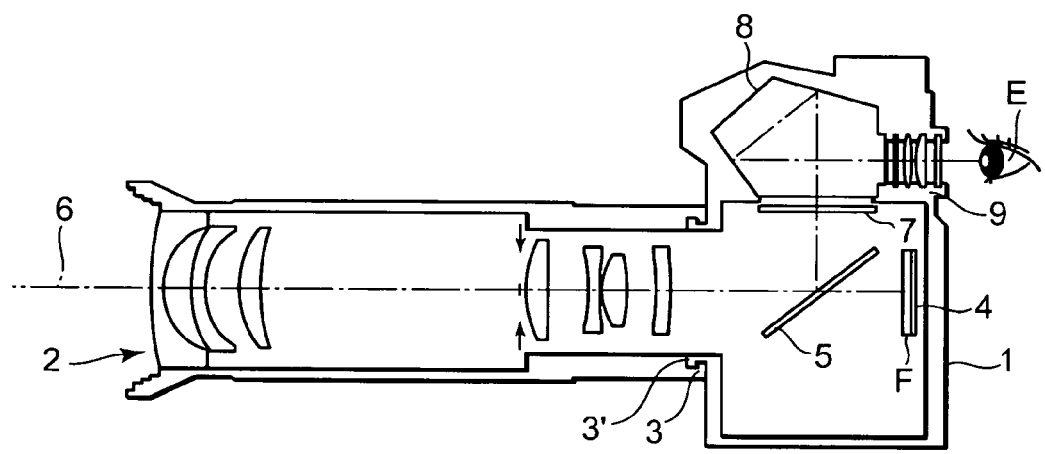
FIG. 11 is a schematic sectional view of a single lens reflex camera to which an exchangeable lens using a two-unit zoom lens system of the present invention has been attached.

FIG. 11 is a schematic sectional view of a single lens reflex digital camera as an electronic image taking apparatus in which a two-unit zoom lens system of the present invention is used as a photographing lens. In FIG. 11, reference numeral 1 denotes a single lens reflex camera body, reference numeral 2 denotes an exchangeable lens for use as a photographing lens, and the two-unit zoom lens system of the present invention is incorporated in the exchangeable lens. The photographing lens 2 has a zoom mechanism and a focus mechanism (not shown). When the zoom lens system disposed in the lens barrel of the photographing lens 2 is driven by these mechanisms, zooming and focusing can be performed. Reference numeral 3 denotes a mount portion disposed on an end portion of the photographing lens barrel, and the portion can be disengageably engaged with a mount portion 3' disposed on the camera body 1. According to this mount mechanism, the photographing lens 2 can detachably be attached to the single lens reflex camera 1, and is usable as the exchangeable lens. As the mount portion, a screw type mount, a bayonet type mount or the like is used. In this example, the bayonet type mount is used.

In the camera body 1, an electronic image pickup device 4 (only an image pickup surface is shown in the drawing) is disposed such as a small-sized CCD image sensor or a CMOS type image sensor. Character F denotes a parallel flat plate group including a filter, and the plate group is drawn more simply than in the embodiment (e.g., FIG. 1A) of the zoom lens system. Reference numeral 5 denotes a quick return mirror (optical path splitting member) disposed between the lens system of the photographing lens 2 and the surface of the image pickup device 4 on the optical path 6 of the photographing lens 2, reference numeral 7 denotes a finder screen disposed in the light path on the reflection side of the quick return mirror 5, reference numeral 8 denotes a pentagonal roof prism for erecting the image formed by the zoom lens system, reference numeral 9 denotes a finder optical system and E denotes an observer's eye (eye point).

In the state shown in FIG. 11, an image of an object (not shown) is formed by the photographing lens 2 on the finder screen 7 disposed in the light path reflected by the quick return mirror. This image is observed by the observer via the pentagonal roof prism 8 and the finder optical system 9. In photographing the object, the quick return mirror 5 is retracted out of the photographing optical path 6, and the object image is formed on the image pickup surface 4 of the electronic image pickup device by the photographing lens 2. This optical image is converted into an electric signal by the image pickup device.

As the photographing lens system 2, any of Numerical Examples 1 to 5 described above may be used.

According to the present invention, a small-sized zoom lens system is obtained in which the telecentric property suitable for a digital single lens reflex camera is secured, and which is advantageous in securing an aberration correction performance and a high magnification changing ratio. Furthermore, it is possible to obtain a zoom lens system in which the number of constituting lenses can be reduced. It is also possible to provide an exchangeable lens and an electronic image pickup device in which the zoom lens systems are used.

The invention being thus described, it will be obvious that the same may be varied in many ways. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. A two-unit zoom lens system comprising, in order from an object side to an image side:
   a first lens unit having a negative refractive power; and
   a second lens unit having a positive refractive power,
   wherein during change of magnification from a wide-angle end to a telephoto end, the first lens unit and the second lens unit are moved so as to reduce a space between the first lens unit and the second lens unit,
   the first lens unit comprises, in order from the object side, a negative sub-unit $G_{1a}$ and a positive sub-unit $G_{1b}$,
   the second lens unit comprises, in order from the object side, a first positive lens $L_{21}$, a second negative lens $L_{22}$, and a third positive lens $L_{23}$, the two-unit zoom lens system further comprising:
an aperture stop disposed in an air space which comes into contact with the first positive lens $L_{21}$,
the following conditions (A), (B) being satisfied:

$$-1.5<(r_{21a}+r_{21b})/(r_{21a}-r_{21b})<-0.87 \quad (A);$$

and $$-1.0<(r_{22a}+r_{22b})/(r_{22a}-r_{22b})<-0.28 \quad (B),$$

in which $r_{21a}$ denotes a paraxial radius of curvature of an object-side surface of the first positive lens $L_{21}$, $r_{21b}$ denotes a paraxial radius of curvature of an image-side surface of the first positive lens $L_{21}$, $r_{22a}$ denotes a paraxial radius of curvature of an object-side surface of the second negative lens $L_{22}$, and $r_{22b}$ denotes a paraxial radius of curvature of an image-side surface of the second negative lens $L_{22}$.

2. A two-unit zoom lens system comprising, in order from an object side to an image side:
a first lens unit having a negative refractive power; and
a second lens unit having a positive refractive power,
wherein during change of magnification from a wide-angle end to a telephoto end, the first lens unit and the second lens unit are moved so as to reduce a space between the first lens unit and the second lens unit,
the first lens unit comprises, in order from the object side, a negative sub-unit $G_{1a}$ and a positive sub-unit $G_{1b}$,
the second lens unit comprises, in order from the object side, a first positive lens $L_{21}$, a second negative lens $L_{22}$, and a third positive lens $L_{23}$,
the two-unit zoom lens system further comprising:
an aperture stop disposed in an air space which comes into contact with the first positive lens $L_{21}$,
the following conditions (B), (C) being satisfied:

$$-1.0<(r_{22a}+r_{22b})/r_{22a}-r_{22b})<-0.28 \quad (B);$$

and $$0.5<f_{2G}/f_{21}<1.1 \quad (C)$$

in which $r_{22a}$ denotes a paraxial radius of curvature of an object-side surface of the second negative lens $L_{22}$, $r_{22b}$ denotes a paraxial radius of curvature of an image-side surface of the second negative lens $L_{22}$, $f_{2G}$ denotes a focal length of the second lens unit, and $f_{21}$ denotes a focal length of the first positive lens $L_{21}$.

3. A two-unit zoom lens system comprising, in order from an object side to an image side:
a first lens unit having a negative refractive power; and
a second lens unit having a positive refractive power,
wherein during change of magnification from a wide-angle end to a telephoto end, the first lens unit and the second lens unit are moved so as to reduce a space between the first lens unit and the second lens unit,
the first lens unit comprises, in order from the object side, a negative sub-unit $G_{1a}$ and a positive sub-unit $G_{1b}$,
the second lens unit comprises, in order from the object side, a first positive lens $L_{21}$, a second negative lens $L_{22}$, and a third positive lens $L_{23}$,
the two-unit zoom lens system further comprising:
an aperture stop disposed in an air space which comes into contact with the first positive lens $L_{21}$,
the following conditions (C), (D) being satisfied:

$$0.5<f_{2G}/f_{21}<1.1 \quad (C);$$

and $$0.14<d_{s12}/f_{2G}<0.20 \quad (D),$$

in which $f_{2G}$ denotes a focal length of the second lens unit, $f_{21}$ denotes a focal length of the first positive lens $L_{21}$, and $d_{s12}$ denotes an air space along an optical axis between the first positive lens $L_{21}$ and the second negative lens $L_{22}$.

4. The zoom lens system according to any one of claims 1, 2 and 3, wherein the second lens unit further comprises a fourth lens $L_{24}$ disposed on the image side of the third positive lens $L_{23}$.

5. The zoom lens system according to claim 4, wherein the fourth lens $L_{24}$ has an aspherical surface.

6. The zoom lens system according to claim 5, wherein the first positive lens $L_{21}$ has a larger absolute value of curvature on an object-side surface than on an image-side surface,
the second negative lens $L_{22}$ has a larger absolute value of curvature on an object-side surface than on an image-side surface; and
the third positive lens $L_{23}$ has a double-convex shape.

7. The zoom lens system according to claim 5, wherein the following condition (E) is satisfied:

$$0.08<d_{s34}/f_{2G}<0.28 \quad (E),$$

wherein $d_{s34}$ denotes an air space along an optical axis between the third positive lens $L_{23}$ and the fourth lens $L_{24}$, and $f_{2G}$ denotes a focal length of the second lens unit.

8. The zoom lens system according to any one of claims 1, 2 and 3, wherein the negative sub-unit $G_{1a}$ comprises, in order from the object side, a negative lens $L_{11}$ and a negative lens $L_{12}$,
the positive sub-unit $G_{1b}$ comprises a positive lens $L_{13}$, and
the number of lenses included in the first lens unit is three.

9. The zoom lens system according to any one of claims 1, 2 and 3, wherein the negative sub-unit $G_{1a}$ comprises an aspherical lens having aspherical surfaces on an object-side surface and an image-side surface.

10. The zoom lens system according to claim 8, wherein the negative lens $L_{12}$ is an aspherical lens having aspherical surfaces on an object-side surface and an image-side surface.

11. The zoom lens system according to claim 10, wherein the object-side surface of the negative lens $L_{12}$ is the aspherical surface having a shape on which a positive power of the surface strengthens from a center toward a periphery thereof, and the image-side surface of the negative lens is the aspherical surface having a shape on which a negative power of the surface weakens from a center toward a periphery thereof.

12. The zoom lens system according to any one of claims 1, 2 and 3, wherein the aperture stop is positioned on the object side of the second lens unit.

13. The zoom lens system according to any one of claims 1, 2 and 3, wherein the aperture stop is positioned on the image side of the first positive lens $L_{21}$ of the second lens unit.

14. An exchangeable lens for use with a camera, comprising:
a lens barrel;
the zoom lens system according to any one of claims 1, 2 and 3 incorporated in the lens barrel; and a mount portion arranged on an end portion of the lens barrel for detachably attaching the lens barrel to a body of the camera.

15. An electronic image taking apparatus comprising:

the zoom lens system according to any one of claims 1, 2 and 3; and an electronic image pickup device which is disposed on an image side of the two-unit zoom lens system and which converts an optical image into an electric signal.

16. The electronic image taking apparatus according to claim 15, further comprising:

an optical path splitting member which is disposed between the two-unit zoom lens system and the electronic image pickup device and which splits an optical path by reflection, wherein an image for observation is formed in a alight path on the reflection side of the optical path splitting member.

* * * * *